(12) United States Patent
Ishiguro et al.

(10) Patent No.: US 12,553,005 B2
(45) Date of Patent: Feb. 17, 2026

(54) AGENT FOR FORMING SOLID LUBRICATING COATING FILM, OIL COUNTRY TUBULAR GOODS, AND THREADED JOINT FOR OIL COUNTRY TUBULAR GOODS

(71) Applicants: JFE STEEL CORPORATION, Tokyo (JP); TOYO DRILUBE CO., LTD., Tokyo (JP)

(72) Inventors: Yasuhide Ishiguro, Tokyo (JP); Seigo Goto, Tokyo (JP); Takashi Koga, Tokyo (JP); Takamasa Kawai, Tokyo (JP); Seiji Ozaki, Tokyo (JP); Hideo Sato, Tokyo (JP); Sachiko Fujimoto, Tokyo (JP); Koichi Shoda, Tokyo (JP); Akira Okubo, Tokyo (JP); Ryota Kobayashi, Tokyo (JP); Ryota Kubo, Tokyo (JP); Kota Toyosawa, Tokyo (JP)

(73) Assignees: JFE STEEL CORPORATION, Tokyo (JP); TOYO DRILUBE CO., LTD., Tokyo (JP)

( * ) Notice: Subject to any disclaimer, the term of this patent is extended or adjusted under 35 U.S.C. 154(b) by 2 days.

(21) Appl. No.: 18/564,135

(22) PCT Filed: May 24, 2022

(86) PCT No.: PCT/JP2022/021280
§ 371 (c)(1),
(2) Date: Nov. 27, 2023

(87) PCT Pub. No.: WO2022/255168
PCT Pub. Date: Dec. 8, 2022

(65) Prior Publication Data
US 2024/0384195 A1    Nov. 21, 2024

(30) Foreign Application Priority Data

May 31, 2021   (JP) .................................. 2021-091463

(51) Int. Cl.
*C10M 111/04*    (2006.01)
*C10M 103/00*    (2006.01)
(Continued)

(52) U.S. Cl.
CPC ......... *C10M 111/04* (2013.01); *C10M 103/00* (2013.01); *C10M 107/32* (2013.01);
(Continued)

(58) Field of Classification Search
CPC ............ C10N 2010/06; C10N 2020/06; C10N 2050/02; C10N 2080/00; C10N 2030/12;
(Continued)

(56) References Cited

U.S. PATENT DOCUMENTS

| 5,106,675 A | 4/1992 | Ara et al. |
| 5,427,698 A | 6/1995 | Hirokawa et al. |

(Continued)

FOREIGN PATENT DOCUMENTS

| CN | 106062105 A | 10/2016 |
| CN | 112048351 A | 12/2020 |

(Continued)

OTHER PUBLICATIONS

Jul. 11, 2023 Office Action issued in Japanese Patent Application No. 2022-550247.
(Continued)

*Primary Examiner* — Vishal V Vasisth
(74) *Attorney, Agent, or Firm* — Oliff PLC

(57) ABSTRACT

An agent for forming a solid lubricating coating film on a thread portion of oil country tubular goods, in which a binder resin contains a prepolymer and a curing agent, the
(Continued)

prepolymer is formed of one or more epoxy resins, 70 parts by weight or more of the prepolymer is contained with respect to 100 parts by weight of the binder resin, the epoxy resin constituting the prepolymer has an epoxy equivalent of 100 or more and 500 or less, the solid lubricant contains boron nitride (BN) in an amount of 80% by weight or more, BN has an average particle size of 10 μm or less, and a total weight of the solid lubricant is 0.1 times or more and two times or less a total weight of the binder resin.

20 Claims, 7 Drawing Sheets

(51) Int. Cl.
    *C10M 107/32*     (2006.01)
    *F16L 15/04*     (2006.01)
    *C10N 40/34*     (2006.01)
    *C10N 50/02*     (2006.01)

(52) U.S. Cl.
    CPC ...... *F16L 15/04* (2013.01); *C10M 2201/0613* (2013.01); *C10M 2209/1033* (2013.01); *C10N 2040/34* (2013.01); *C10N 2050/02* (2013.01)

(58) Field of Classification Search
    CPC . C10N 2040/34; C10N 2020/02; F16L 15/04; F16L 15/001; C10M 111/04; C10M 103/00; C10M 107/32; C10M 169/04; C10M 2209/0845; C10M 2201/087; C10M 2213/062; C10M 2201/04; C10M 2207/125; C10M 2209/1033; C10M 2201/0613; F16B 7/182; F16B 33/02; F16B 33/008; F16B 33/06
    See application file for complete search history.

(56) References Cited

U.S. PATENT DOCUMENTS

| | | | |
|---|---|---|---|
| 8,562,771 | B2 | 10/2013 | Ribalta et al. |
| 10,294,441 | B2 | 5/2019 | Sasaki et al. |
| 10,655,228 | B2 | 5/2020 | Millet et al. |
| 2003/0094810 | A1 | 5/2003 | Goto et al. |
| 2006/0197343 | A1 | 9/2006 | Imai et al. |
| 2010/0301600 | A1 | 12/2010 | Goto et al. |
| 2012/0018081 | A1 | 1/2012 | Ribalta et al. |
| 2012/0112456 | A1 | 5/2012 | Nagareo et al. |
| 2014/0352837 | A1 | 12/2014 | Yamamoto et al. |
| 2015/0074978 | A1 | 3/2015 | Stephenson et al. |
| 2015/0130182 | A1 | 5/2015 | Sasaki et al. |
| 2015/0210888 | A1 | 7/2015 | Goto |
| 2016/0244883 | A1 | 8/2016 | Millet et al. |
| 2017/0073605 | A1 | 3/2017 | Sasaki et al. |
| 2017/0138526 | A1 | 5/2017 | Goto et al. |
| 2019/0003620 | A1 | 1/2019 | Goto et al. |
| 2019/0010767 | A1 | 1/2019 | Goto |
| 2020/0166163 | A1 | 5/2020 | Goto |
| 2021/0364119 | A1 | 11/2021 | Goto |

FOREIGN PATENT DOCUMENTS

| | | |
|---|---|---|
| EA | 033784 B1 | 11/2019 |
| EA | 034580 B1 | 2/2020 |
| EP | 1 959 179 B1 | 5/2010 |
| JP | H04-209698 A | 7/1992 |
| JP | H05-059387 A | 3/1993 |
| JP | H09-79262 A | 3/1997 |
| JP | H11-124591 A | 5/1999 |
| JP | 2002-221288 A | 8/2002 |
| JP | 2003-183684 A | 7/2003 |
| JP | 2008-527249 A | 7/2008 |
| JP | 2011-012251 A | 1/2011 |
| JP | 2015-501906 A | 1/2015 |
| JP | WO2013/183634 A1 | 2/2016 |
| JP | 2017-071844 A | 4/2017 |
| JP | WO2015/198557 A1 | 4/2017 |
| JP | WO2017/110686 A1 | 7/2018 |
| JP | WO2018/216497 A1 | 3/2020 |
| WO | 2006/075774 A1 | 7/2006 |
| WO | 2009/072486 A1 | 6/2009 |
| WO | 2014/042144 A1 | 3/2014 |
| WO | 2017/110685 A1 | 6/2017 |
| WO | 2018/216416 A1 | 11/2018 |

OTHER PUBLICATIONS

Aug. 2, 2022 International Search Report issued in International Patent Application No. PCT/JP2022/021280.

Nov. 21, 2023 International Preliminary Report on Patentability issued in International Patent Application No. PCT/JP2022/021280.

Tsuru et al., "Performance properties of tubular connection under hostile well conditions and optimum make-up procedure", Journal of the Japanese Association for Petroleum Technology, Nov. 1996, vol. 61, No. 6, pp. 527-536.

Jul. 3, 2024 Office Action issued in Russian Patent Application No. 2023131211.

Jul. 16, 2024 Extended Search Report issued in European Patent Application No. 22815918.2.

Aug. 2, 2025 Office Action issued in Chinese Patent Application No. 202280037264.7.

AGENT FOR FORMING SOLID LUBRICATING COATING FILM, OIL COUNTRY TUBULAR GOODS, AND THREADED JOINT FOR OIL COUNTRY TUBULAR GOODS

This application is a 371 of PCT/JP2022/021280, filed May 24, 2022.

TECHNICAL FIELD

The present disclosure is technology relating to lubrication and corrosion resistance of oil country tubular goods and a threaded joint for oil country tubular goods. The present disclosure is technology relating to oil country tubular goods and a threaded joint for oil country tubular goods in each of which a solid lubricating coating film is formed on a surface (including a metal sealing surface) of a thread portion instead of a wet lubricating compound. In the present specification, a tightening surface of a thread portion includes a metal sealing surface.

Here, the solid lubricating coating film means a coating film including a binder resin as a matrix component, a solid lubricant dispersed and distributed in the binder resin, and an additive added as necessary. In addition, the present disclosure intends to impart corrosion resistance while improving lubrication by a solid lubricating coating film that achieves lubrication of a connection for oil country tubular goods.

In addition, in the present specification, a phenomenon described by the terms "lubricity" and "high lubricity" means a slippery phenomenon with low friction in a broad sense. In addition, the high lubricity means that the number of times that make-up/break-out can be performed (also referred to as M/B number of times) is a specified number of times or more in a narrow sense. For example, seizure resistance of a threaded joint for oil country tubular goods is described in the API 5C5 standard. In the API 5C5 standard, it is required that make-up can be performed up to three times in a casing size. In addition, it is required that make-up can be performed up to ten times in a tubing size.

Note that in the present specification, a pipe having a female thread may be collectively referred to as a box. That is, a coupling is also described as a type of box.

BACKGROUND ART

In a threaded joint for oil country tubular goods, for lubrication of a thread portion, conventionally, a tightening surface (sealing surface) (hereinafter, also simply referred to as "tightening surface") which is a surface of a thread portion of at least one of a male thread and a female thread is surface-treated by a Mn phosphate chemical conversion coating film or electroplating using Cu or the like to form a coating film. Thereafter, a lubricating compound containing Pb, Zn, or the like is applied onto the coating film to achieve lubrication.

Note that in the present specification, when a coating film is formed on a tightening surface (sealing surface) of a thread portion, the coating film is also referred to as a tightening surface.

On the other hand, in recent years, non-wet lubrication technology by "dry/dope-free" has attracted attention. "Dry/dope-free" means that a film itself is not an API-mod compound-like viscous liquid and that the film itself does not contain a harmful heavy metal. As such "dry/dope-free" lubrication, there is technology of forming a solid lubricating coating film on a tightening surface to achieve lubrication. The present disclosure is technology related to the "dry/dope-free" lubrication.

Past PTLs disclose inventions related to various solid lubricating coating films. The solid lubricating coating film includes a lubricant component that acts for lubrication and a solid film as a matrix component that holds the lubricant component in the film. The solid film means a film that is not viscous and is not liquid, and also means to complete lubrication at the time of make-up/break-out of the connection by itself. A conventional Mn phosphate film or Cu electroplated film itself is a solid film. However, since it is premised that lubrication is achieved by applying a greasy compound, the conventional Mn phosphate film and Cu electroplated film are not included in the solid lubricating coating film. In the present disclosure, lubrication is achieved as a solid film, and an organic resin film is assumed as the solid film. Therefore, in the following description, the solid film is also referred to as a binder resin.

A conventional lubricating coating film used in a threaded joint for oil country tubular goods are described in, for example, PTLs 1 to 9.

In the field of a connection for oil country tubular goods, BN is widely exemplified in many PTLs as one of candidates for a solid lubricant. For example, PTLs 1 and 2 exemplify BN as a solid lubricant present in a solid lubricating coating film.

In addition, an epoxy resin is exemplified in past PTLs. However, there are few PTLs that clearly define an epoxy resin and define a chemical composition of the epoxy resin. In addition, there are many PTLs that seem to specify technology but cannot completely specify the technology.

The definition of the epoxy resin is very broad. The epoxy resin is generally a generic term for a thermosetting resin formed by crosslinking and bonding a chemical substance having an epoxy group as a prepolymer (precursor to be the epoxy resin) and a curing agent to each other. However, academically, commercially, and in description of PTLs, the term epoxy resin may refer to a chemical substance itself having an epoxy group of a prepolymer or an epoxy resin that can be generated by copolymerization of the prepolymer and a curing agent. However, in most cases, they are used without distinction. In past PTLs, the term "epoxy resin" generally refers to the latter. In short, past PTLs only describe that the epoxy resin is widely used (see PTLs 3 to 8).

Note that in the following description, when the present disclosure is described, an epoxy resin agent as an original material (prepolymer) for forming an epoxy resin film is referred to as "prepolymer" or "epoxy resin in a narrow sense". In addition, an epoxy resin (film) finally obtained by polymerizing a prepolymer and a curing agent is referred to as an "epoxy resin coating film" to be distinguished.

Next, PTLs 3 to 9 will be described.

PTL 3 discloses an invention for forming a solid lubricating coating film on a Cu—Sn—Zn plating base. PTL 3 uses a resin selected from one or two of an epoxy resin and a polyamideimide resin as a binder resin of the solid lubricating coating film.

PTLs 4 to 6 exemplify an epoxy resin as a component of a solid lubricating coating film having excellent heat resistance and excellent lubricity. PTLS 4 to 6 do not clearly disclose to what degree of temperature the epoxy resin is resistant to heat, and it is difficult to grasp a characteristic of the epoxy resin used.

PTL 7 clearly describes that a two-liquid mixed type epoxy is formed on a Zr-based plating base. However, the two-liquid mixed type epoxy is not novel, and as described above, the epoxy resin is formed of an epoxy resin curing agent in a narrow sense as a prepolymer. The two-liquid mixed type only means a type in which two liquids are mixed on the spot. Since even a one-liquid type contains a prepolymer and a curing agent, the two-liquid mixed type itself does not have novelty.

PTL 8 discloses an invention in which an acrylic silicon resin is formed on an ultraviolet curable resin. PTL 8 exemplifies an acrylic acid-modified epoxy resin as one of candidates, and describes an acrylic acid-modified epoxy resin in which a main chain skeleton is formed of an epoxy resin and a terminal of the main chain skeleton is acryloylated.

PTL 9 discloses a photocurable acrylic resin coating film. PTL 9 describes a photocurable (meth)acrylate resin, specifies a film obtained by copolymerizing (meth)acrylate monomers based on a trigger such as a photopolymerization initiator, and exemplifies an epoxy as well as a polyester, a polyether, and a polyurethane as a main chain structure forming an acrylate side chain among candidates.

In addition, although it is not an evaluation case of a solid lubricating coating film, NPL 1 describes, as a make-up test method with a vertical power tong using a short pin, a method for performing make-up/break-out in a state where a weight of 5 kN (510 kg weight) is constantly loaded on an upper end surface of the short pin. However, NPL 1 performs evaluation using a conventional greasy compound as a means for determining whether or not a novel connection design is acceptable.

CITATION LIST

Patent Literature

PTL 1: JP 2017-110686 A1
PTL 2: WO 2017-110685 A
PTL 3: JP 2018-216497 A1
PTL 4: JP 2015-501906 A
PTL 5: JP 2015-198557 A1
PTL 6: JP 2017-110685 A1
PTL 7: JP 2017-71844 A
PTL 8: JP 2013-183634 A1
PTL 9: JP 2011-12251 A

Non Patent Literature

NPL 1: Tsuru et al., Journal of Japan Petroleum Institute, Vol. 61, No. 6 (1996), PP. 527-536.

SUMMARY OF INVENTION

Technical Problem

Lubrication of a connection for oil country tubular goods targeted by the present disclosure is in a special sliding situation.

That is, at a site (actual well), a pin having an actual length of about 8 m or more and less than 15 m is made up and broken out to a box set below. At this time, although the pin is made up and broken out using a power tong in a state of being lifted by a crane, a total load of the pin may be applied to the box connection. That is, lubrication is performed in a large load applied state.

At this time, the pin is not necessarily made up and broken out in an ideal state. That is, at the time of make-up, the pin connection is inserted into the box connection or set in a slightly tightened state by hand. However, the pin is not set upright and immobile with respect to the box connection. In addition, the pin is not set straight while being inclined in an oblique direction, that is, in a state of rising without bending. That is, an upper end side (a tip side opposite to a make-up side) of the pin slightly bends according to an elastic modulus (Young's modulus) of a material and the actual pin length while a lower portion of the pin is constrained by the box connection. In particular, in a case of a pin having a length of 8 m or more, when viewed from below, the pin appears to bend while being set straight in the box. From this state, the pin is made up and broken out. Therefore, the box connection and the pin connection are never made up and broken out in a state where a load is applied homogeneously and symmetrically to the box connection and the pin connection. For this reason, make-up/break-out are performed in a state where parts of thread surfaces locally and strongly hit on each other. That is, lubrication is performed in an unbalanced load state. In addition, a portion where parts of the thread surfaces locally and strongly hit on each other changes depending on make-up/break-out.

In conventional lubrication technology using a greasy compound, the compound moves following make-up/break-out. For this reason, a lubricant (lubricating compound) functions to converge make-up/break-out in a favorable direction even when there is a slight change in lubrication conditions and the like. Therefore, in an evaluation test (also referred to as a laboratory test) of make-up/break-out a threaded joint, it is possible to grasp a lubrication situation of an actual size pin by evaluation using a short pin without relying on evaluation using the actual size pin.

Meanwhile, according to an examination of the inventor, in technology of lubricating a connection for oil country tubular goods using a solid lubricating coating film, the solid lubricating coating film is inevitably scraped to some extent. It is necessary to devise a solution such that a thread gap is not clogged with shavings of the solid lubricating coating film. At this time, a secondary product formed from the scraped solid lubricating coating film does not necessarily move in conjunction with and following make-up/break-out.

The above is what occurs in an actual well, and is a largely different point between the case of lubrication using the solid lubricating coating film and the case of lubrication using the lubricating compound.

When a solid lubricating coating film is evaluated in a laboratory test, in evaluation using a short pin as in the case of lubrication using the lubricating compound, it is not necessarily possible to simulate an influence of a large load and an unbalanced load for the above reason. In evaluation using a short pin shorter than a pin used in a situation in an actual well, it has been found that a solid lubricating coating film is less likely to be scraped, and it is not possible to create a situation in which a seizure behavior in the actual well can be simulated.

As described above, in the conventional evaluation using a short pin, a secondary product formed of shavings of the solid lubricating coating film causes clogging and seizure, or the secondary product is pressed against a tightening surface again. As a result, it is not possible to simulate, for example, a situation in which an effect like a lubricating coating film is maintained. That is, in the conventional evaluation simply using a short pin, evaluation of the solid lubricating coating film is inevitably lax, and when a physical property parameter of the solid lubricating coating film is determined, a region that should be unacceptable is erroneously evaluated to be a suitable range.

For this reason, the inventors have found that in reality, a suitable range is often described in description of conventional past literatures based on the above lax evaluation.

Then, the inventor has found that it is necessary to specify a parameter group related to a solid lubricating coating film by performing evaluation in a situation similar to a situation in which a connection for oil country tubular goods is exposed at the time of make-up/break-out in an actual well, that is, on the premise that make-up/break-out are performed with a large load and an unbalanced load. For this purpose, the inventor has found that it is necessary to set each definition after guaranteeing lubricity and clarifying the meanings of definitions of upper and lower limits of a parameter according to use conditions in the actual well. That is, the present inventor has found that it is important to specify upper and lower limits of a parameter in evaluation of a situation conforming to the actual well.

Herein, as described above, in evaluation of a lubrication behavior to be confirmed in lubrication of a connection for oil country tubular goods, conventionally, a make-up/break-out behavior with a power tong using a short pin and the number of times of make-up/break-out are often evaluated.

At this time, when a greasy compound is used as a lubricant, the compound also moves in conjunction with make-up/break-out. For this reason, when lubrication is evaluated, there is no particular problem even if the lubrication is evaluated with a horizontal tong or a vertical tong using a short pin, and a lubrication behavior can be evaluated. That is, the conventional greasy compound can be evaluated even by performing a laboratory test using a short pin, including a design of a thread, whether or not a base layer such as chemical conversion treated layer or electroplated layer is acceptable, and comparison and evaluation of the compound itself.

Meanwhile, there is a problem in evaluation of lubrication of the solid lubricating coating film as described above. That is, in evaluation by a laboratory test simply using a short pin, a behavior in an actual well is not simulated, and evaluation of the lubrication is very lax. For this reason, there is a problem that even a case where evaluation using a short pin is "acceptable" in the conventional laboratory test does not necessarily mean that evaluation is "acceptable" in make-up/break-out in an actual well.

In addition, since lubrication of the connection for oil country tubular goods is different from other lubrication behaviors in some points, there is a problem that a definition with evaluation based on other lubrication conditions cannot be applied.

In general, regarding a lubrication behavior between two objects that rub against each other, a situation is assumed in which one object is fixed and the other object moves. It is assumed that lubrication starts from a state where the moving object is in close contact with the fixed object. Even when both objects move, lubrication usually starts from a state where both objects are in contact with each other.

Meanwhile, lubrication of the connection for oil country tubular goods starts from a state where a pin connection (male thread) has rattling with respect to a box connection (female thread) by connection play in an initial stage of make-up. Therefore, the connection is not all the time in stable contact with each other until the threads are engaged with each other to some extent. That is, in lubrication of the connection for oil country tubular goods, a case where the threads strongly hit on each other and a case where the threads hardly hit on each other are unevenly distributed, and there is a high concern that the lubricating coating film is damaged when the threads strongly hit on each other.

Furthermore, in lubrication after the threads are engaged with each other, the threads slide under an influence of a lubrication situation in the place.

In particular, in a situation where there is "rattling" until the threads are engaged with each other, in the conventional method using a greasy compound, the compound moves in conjunction with connection make-up at an initial stage of make-up and a final stage of break-out when the connection has rattling. Therefore, an influence on the rattling is small. Meanwhile, in a case of the solid lubricating coating film, the solid lubricating coating film is directly affected by an unbalanced load derived from rattling, and the solid lubricating coating film is easily damaged, which is different from the conventional method using a greasy compound.

In addition, in an actual well, there is an influence by application of the total weight of a pin connection to a box connection at the time of make-up/break-out. In addition, since there is rattling as described above, a load is not uniformly applied, and the pin tends to eccentrically rotate until the threads are engaged with each other. For this reason, the solid lubricating coating film needs to be a film that allows lubrication to withstand a large load applied as an unbalanced load. A film that is thoroughly removed or a film that is almost completely destroyed and lost cannot withstand the large load. An actual well is often operated with oil country tubular goods having a length of about 12 to 16 m. For example, oil country tubular goods having a length of about 12 m (about 40 feet) and an outer diameter of 9⅝" has a weight of about one ton load. In a marine rig, three pin connections connected in advance are often made up and used. Therefore, when oil country tubular goods having an outer diameter of 9⅝" is used, a severe situation occurs in which a load of about three tons is applied to a box side.

In lubrication of the connection for oil country tubular goods, it is necessary to assume lubrication that withstands such a large load and an unbalanced load. As a result of various studies, the inventor has found that what is important is to devise a solid lubricant and a binder resin in consideration of how to suppress damage to a solid lubricating coating film in a situation of a large load and in a situation where there is "rattling" until the threads are engaged with each other.

Meanwhile, in past literatures, it is difficult to say that a solid lubricating coating film is designed based on such a viewpoint.

Here, the inventor has found that the above finding is unique to a solid lubricating coating film.

In the conventional lubrication in which a greasy compound is applied, the viscous liquid greasy compound also moves in conjunction with make-up/break-out. Therefore, a large part of an influence of a large load or an unbalanced load is alleviated. For this reason, a lubrication behavior can be evaluated without particular problem even if the lubrication behavior is evaluated with a horizontal tong using a short pin or evaluated with a vertical tong using a short pin with reference to past literatures.

Meanwhile, in a case of a lubrication behavior of a connection for oil country tubular goods using a solid lubricating coating film as in the present disclosure, the solid lubricating coating film is damaged and peeled off, or inevitably, the solid lubricating coating film is gradually and thinly scraped even by make-up until the threads are engaged with each other or make-up after the threads are engaged with each other. Peeled shavings do not necessarily move in conjunction with make-up/break-out unlike the greasy compound. Then, it has been found that an influence of release of a secondary product (shavings) derived from the scraped solid lubricating coating film into a gap between a pin connection and a box connection largely affects lubrication. That is, if the gap is clogged by the shavings, the shavings may directly lead to seizure. Meanwhile, there is also a case where the shavings are pressed with a large load to reconstitute a film, and the film adheres to one of the threads again to improve lubrication.

Then, the inventor has found that, in evaluation using a short pin in a laboratory test, neither a situation of a large load nor a situation of an unbalanced load occurring in an actual well can be simulated. That is, in the evaluation simply using a short pin, the amount of formation of a secondary product itself derived from the solid lubricating coating film is small. For this reason, a lubrication behavior is often erroneously judged to be acceptable, and it is often found that a design of the solid lubricating coating film is not good only when the solid lubricating coating film is applied to an actual well.

Moreover, in a laboratory test, it is not possible to simulate what actually occurs in a well without intentionally creating a situation in which there is "rattling" until the threads are engaged with each other. Meanwhile, it is not realistic to perform a test every time in an actual well or a simulated well (a test site where a make-up/break-out test is performed by causing an actual size pin to stand) using an actual size pin. That is, experiment cost is enormous, which is not realistic. For example, the latter requires rental cost of about ten million yen or more per day, and in a solid lubrication test, the maximum number of times of make-up/break-out is estimated to be 20 to 30 times, which requires enormous cost.

In past literatures, most of evaluations of a solid lubricating coating film do not take this into consideration. That is, evaluation of thread lubrication is not particularly clearly described, and there are many application cases of a horizontal tong often used in a laboratory test and a vertical tong simply using a short pin. In this conventional evaluation, since the above influence of a large load and an unbalanced load is eliminated, basically, most of the evaluation results are good. Therefore, specifying suitable upper and lower limits of lubrication using a solid lubricating coating film in these evaluation methods does not mean a suitable range in a true meaning. As described above, even conditions selected in the evaluation of a short pin in the conventional laboratory test include a condition under which lubrication is not good in an actual well, and do not specify technology.

Here, NPL 1 describes that a load of 510 kg weight is continuously applied to an upper end of a pin all the time both at the time of connection make-up and at the time of connection break-out, although this is not an examination of a lubrication behavior of a solid lubricating coating film. The application of a load of 510 kg weight may have an intention of applying a weight corresponding to one actual size pin having a size of 7". As described above, in evaluation of a solid lubricating coating film, it is important to simulate a large load and an unbalanced load, which occurs in an actual well. This is because a secondary phenomenon caused by a secondary product derived from a solid lubricating coating film largely affects lubrication.

However, when a method disclosed in NPL 1 is applied to a laboratory test, there are two problems. First, a load corresponding to one to three connected actual size pins in an actual well is applied in the actual well, but application of 510 kg weight corresponds only to a specific case where the pins are light. That is, a large load is not necessarily simulated depending on the size of the pin.

Second, an unbalanced load cannot be simulated. As can be determined from FIG. 5 and the like of NPL 1, particularly in a case of a premium joint, since there is no one rotation before make-up, NPL 1 intends to test lubrication performed from a state where an initial make-up position (make-up start point) by tightening by hand is in a state where threads are engaged with each other. In addition, there is the following problem when break-out is continued in a state where a load of a weight is applied even at the time of break-out, although this is not easily found.

That is, at the time of break-out, conversely, the weight acts as a balancer, and the connection is loosened straight from a made up position without rattling. Therefore, the pin does not swing around, and occurrence of seizure at the time of break-out, which occurs in an actual well, cannot be appropriately simulated. For this reason, depending on a situation, a situation may occur in which it is misunderstood that a lubrication characteristic is good. Therefore, it has also been found that a condition parameter related to a solid lubricating coating film needs to be proved to have an excellent lubrication characteristic by performing a simulation considering a lubrication state where threads are not sufficiently engaged with each other and lubrication after the threads are sufficiently engaged with each other.

Here, as described above, in the field targeted by the present disclosure, BN is widely exemplified in many PTLs as one of candidates for a solid lubricant. For example, PTLs 1 and 2 exemplify BN as a solid lubricant present in a solid lubricating coating film. However, it is not necessarily possible to maintain lubrication only by simply defining BN as a broad sense from a viewpoint of whether lubricity that can withstand a lubrication behavior in an actual well can be ensured as described above.

In addition, past PTLs exemplify use of an epoxy resin as a binder resin, but there are very few PTLS that can clearly define the binder resin according to the quality of the epoxy resin.

PTLs 3 to 8 refer to a mixture of a prepolymer and a curing agent as an epoxy resin, or refer to an epoxy resin coating film formed of the prepolymer and the curing agent as an epoxy resin and merely exemplify the epoxy resin as one of candidate materials. In addition, the definition of the epoxy resin is broad, and what is specified by the epoxy resin is unclear.

Here, an epoxy group is a three-membered ring having oxygen of oxy-cyclopropane (oxirane), and is caused to undergo a crosslinking reaction with a selected appropriate curing agent in order to become a resin. This means that the three-membered ring is opened and polymerized. In short, the epoxy group is not present in a state where the epoxy group has become the epoxy resin, and is in a final form of polyether (including R—O—R'), polyester (including R—COO—R'), polyhydroxyether (including-OH group and ether group), polyhydroxylamine (including-OH group and amine group), or the like.

The characteristics of a film also take over the characteristics of the epoxy resin in a narrow sense and the characteristics of the curing agent. Therefore, even if the epoxy resin in a broad sense does not specify any technology. The characteristics of the epoxy resin coating film are also determined by a combination of an "epoxy resin in a narrow sense" agent as a prepolymer and a curing agent, and even if only the epoxy resin agent in a narrow sense is mentioned, the characteristics of the epoxy resin coating film are not specified. With reference to past PTLs, it can be interpreted that any epoxy group can be widely applied, but actually, this is not necessarily the case. In most cases, high lubricity as targeted by the present disclosure cannot be ensured. In order to achieve the object, it is necessary to select an epoxy resin coating film excellent in high lubricity in a final form.

In addition, in past PTLs, an expression that an epoxy resin (which possibly means an epoxy resin coating film as a final film formed of an epoxy resin and a curing agent) is contained in an amount of oo % is also ambiguous. As described above, in a combination of an epoxy resin in a narrow sense and a curing agent, when the epoxy resin is represented by A and the curing agent is represented by B, polymerization is performed as ABABA . . . . It is an approximate mixing rule of the epoxy resin that mixing is performed by combining the equivalent of an epoxy group of the epoxy resin in a narrow sense with the equivalent of an amine when the curing agent is an amine-based agent or the equivalent of active hydrogen when the curing agent is another curing agent including an amine. Therefore, even an expression of the weight occupied by the epoxy resin film expresses a numerical value considerably varying depending on selection of the prepolymer and the curing agent. By a simply limiting expression of containing the epoxy resin in an amount of oo %, the epoxy resin cannot be specified and technology is not specified.

That is, a simple expression of an epoxy resin expresses use of an epoxy resin agent as an original material (prepolymer), and a polymer having a completely different structure is obtained depending on selection of a curing agent. Therefore, unless the physical properties themselves of an "epoxy resin" as a finally cured object are specified, the physical properties of an agent containing an epoxy group of a prepolymer are specified, a curing agent is specified, or a range of a parameter secondarily specifying these is clearly specified, technology is not specified.

PTL 3 selects a resin selected from one or two of an epoxy resin and a polyamideimide resin as one formed on a Cu—Sn—Zn plating base. It is not clear what the epoxy resin described here refers to. That is, an epoxy resin having poor lubricity is widely included.

PTLs 4 to 7 merely exemplify an epoxy resin for a solid lubricating coating film, and it is also difficult to specify this epoxy resin.

PTL 8 discloses an invention in which an acrylic silicon resin is formed on an ultraviolet curable resin. This is a case where an acrylic acid-modified epoxy resin is exemplified as one of candidates among organic resins and inorganic resins for a binder resin of the ultraviolet curable resin. In addition, a main chain skeleton is formed of an epoxy resin and a terminal of the main chain skeleton is acryloylated. PTL 8 merely exemplifies the acrylic acid-modified epoxy resin, and does not specify other information such as a curing agent of the epoxy resin coating film or the characteristics thereof.

Meanwhile, PTL 9 describes a photocurable acrylic resin coating film. PTL 9 specifies a film obtained by copolymerizing a photocurable (meth)acrylate resin with a (meth) acrylate monomer group with a trigger such as a photopolymerization initiator. PTL 9 exemplifies, as a candidate, an epoxy together with a polyester, a polyether, and a polyurethane as a main chain structure forming an acrylate side chain. This invention expresses an acrylate (corresponding to the prepolymer of the present disclosure) and a polymer (corresponding to the curing agent of the present disclosure) using a unit system of per hundred resin (PHR), and can accurately express the ratio and weight of an epoxy resin when a main chain structure is formed of the epoxy resin. The description of PTL 9 is clearer than the definitions in PTLs 3 to 7. However, meanwhile, since the present disclosure intends not a photopolymerization resin but a film formed by firing (curing), PTL 9 is different in technology from the present disclosure.

The present invention has been made in view of the above points, and an object of the present invention is to provide a solid lubricating coating film capable of imparting excellent corrosion resistance as well as lubricity to a connection for oil country tubular goods even when the solid lubricating coating film is adopted for lubrication.

Solution to Problem

In contrast to a situation in which a lubricating material has been conventionally selected based on the above lax evaluation, the present inventor targets oil country tubular goods and a threaded joint for oil country tubular goods each having excellent characteristics of both lubrication and rust prevention, and an agent for manufacturing the oil country tubular goods and the threaded joint for oil country tubular goods. The present inventor targets a composition obtained by adding BN as a solid lubricating component at a proper ratio to a binder resin mainly containing an epoxy resin and appropriately adding another additive thereto. These films are formed by specifying a parameter so as to be able to withstand severe lubrication conditions such as those performed in lubrication of an actual connection for oil country tubular goods, to which a large load and an unbalanced load are applied as described above.

That is, an aspect of the present invention is an agent for forming a solid lubricating coating film on a thread portion of oil country tubular goods, in which a solid lubricant is dispersed in a binder resin, the binder resin contains a prepolymer and a curing agent, the prepolymer is formed of one or more epoxy resins, 70 parts by weight or more of the prepolymer is contained with respect to 100 parts by weight of the binder resin, the epoxy resin constituting the prepolymer has an epoxy equivalent of 100 or more and 500 or less, the solid lubricant contains boron nitride (BN) in an amount of 80% by weight or more, BN has an average particle size of 10 μm or less, and a total weight of the solid lubricant is 0.1 times or more and two times or less a total weight of the binder resin.

Another aspect of the present invention is oil country tubular goods having a lubricating coating film including a solid lubricating coating film on a thread portion, in which the solid lubricating coating film is formed by dispersing a solid lubricant in a binder resin, the binder resin contains an epoxy resin cured with a curing agent, 70 parts by weight or more of the epoxy resin is contained with respect to 100 parts by weight of the binder resin, the epoxy resin has an epoxy equivalent of 100 or more and 500 or less, the solid lubricant contains boron nitride (BN) in an amount of 80% by weight or more, BN has an average particle size of 10 μm or less, and a total weight of the solid lubricant is 0.1 times or more and two times or less a total weight of the binder resin.

Advantageous Effects of Invention

An aspect of the present invention comprehensively specifies elements (physical property parameters) of a binder resin (main component: epoxy resin) and a solid lubricant (main component: BN) constituting a solid lubricating coating film with reference to evaluation by a newly devised laboratory test capable of reproducing a behavior in an actual well. As a result, an aspect of the present invention can provide an agent capable of forming a solid lubricating coating film (lubricating coating film) capable of imparting lubricity equal to or higher than that of a greasy compound for lubrication that has been conventionally used, and a lubrication characteristic and corrosion resistance comparable to a rust preventive greasy compound for storage or an oil rust preventive material even when the solid lubricating coating film is adopted for lubrication.

For example, an aspect of the present invention can provide a threaded joint for oil country tubular goods having lubricity and corrosion resistance during make-up, considering an actual well-corresponding condition that may occur in an actual well environment. Note that the actual well-corresponding condition is a situation in which a pin weight is applied to a box from above, a situation in which a load is applied obliquely due to a deviation of a shaft center, a situation in which a load is often applied locally rather than uniformly, or the like.

BRIEF DESCRIPTION OF DRAWINGS

FIGS. 4A and 4B are schematic diagrams of a make-up chart, in which FIG. 4A illustrates a case of an actual well, and FIG. 4B illustrates a case of a conventional laboratory test;

DESCRIPTION OF EMBODIMENTS

Figure 1:
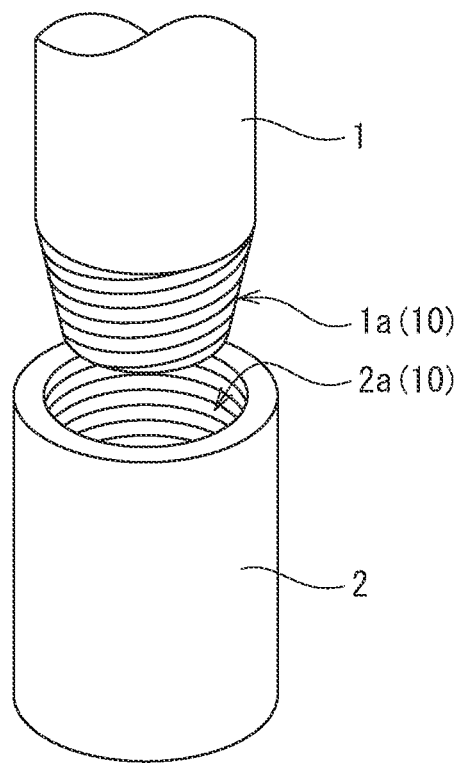
FIG. 1 is a diagram illustrating oil country tubular goods and a threaded joint for oil country tubular goods.

Next, an embodiment of the present invention will be described with reference to the drawings.

Conventionally, for the purpose of lubrication and rust prevention during storage, and in order to achieve both the objects, lubrication for make-up/break-out and long-term outdoor storage (rust prevention) have been achieved by using different types of greasy compounds or the same type of greasy compound.

On the other hand, in a threaded structure of the present embodiment, an epoxy resin coating film whose parameter is appropriately specified is used as a binder resin for one or both of a portion where a male thread side metal and a female thread side metal of a connection material are in contact with each other or a part thereof. A solid lubricating coating film in which BN as a solid lubricant whose parameter is appropriately specified is dispersed is adopted. As a result, the present embodiment intends to improve lubrication and to impart corrosion resistance.

In addition, an agent for forming the solid lubricating coating film is also a target. In addition, a film structure suitable for lubrication of a connection for oil country tubular goods including a lubricating coating film obtained by combining a coating film of the present embodiment and a base layer and film hardness on the other side of a non-forming side is also a target. In addition, the present embodiment can be applied to a range in which the lubricating coating film can be widely used for lubrication and rust prevention improvement of a metal material as another way of use.

The inventor studied in view of the above-described problems. As a result, the above problems can be solved through mixing for an agent, formation of a solid lubricating coating film of a connection for oil country tubular goods, a method for confirming the formation of the solid lubricating coating film, and the like.

The solid lubricating coating film of the present embodiment is obtained by study in which an epoxy resin cured with a curing agent is used as a main component of a binder resin and boron nitride (BN) is used as a main component of a solid lubricant.

(Configuration)

The present embodiment is an invention relating to a coating film structure formed on a tightening surface of a thread portion of oil country tubular goods in oil country tubular goods and a threaded joint for oil country tubular goods used for actual oil/gas, and a structure having the coating film structure as a lubricating coating film. The present embodiment is characterized by a lubricating coating film including a solid lubricating coating film formed on the thread portion of the oil country tubular goods, and the threaded structure itself of the oil country tubular goods and the threaded joint of the oil country tubular goods is not particularly limited. As the threaded structure of the oil country tubular goods and the threaded joint of the oil country tubular goods, it is only required to adopt a known or novel threaded structure.

<Oil Country Tubular Goods and Threaded Joint for Oil Country Tubular Goods>

The oil country tubular goods includes, for example, a box 2 such as a coupling and a pin 1 as illustrated in FIG. 1.

As illustrated in FIG. 1, the threaded joint for oil country tubular goods includes the box 2 such as a coupling having a female thread 2a and the pin 1 having a male thread 1a. A lubricating coating film including a solid lubricating coating film is formed on a contact surface (tightening surface 10) of a thread portion in at least one of the box 2 and the pin 1.

<Agent>

Hereinafter, an agent for forming the solid lubricating coating film in the present embodiment will be described.

The agent of the present embodiment is formed by dispersing a solid lubricant in a binder resin as a matrix component.

The agent contains a binder resin, a solid lubricant, and a solvent component.

The binder resin contains a prepolymer and a curing agent.

The prepolymer is formed of one or more epoxy resins. The prepolymer is contained in an amount of 70 parts by weight or more with respect to 100 parts by weight of the binder resin.

The epoxy resin constituting the prepolymer has an epoxy equivalent of 100 or more and 500 or less.

The epoxy resin constituting the prepolymer preferably has a glass transition temperature Tg of 100° C. or higher.

The solid lubricant contains boron nitride (BN) in an amount of 80% by weight or more. The BN has an average particle size of 10 μm or less.

A total weight of the solid lubricant is 0.1 times or more and two times or less a total weight of the binder resin.

The solvent component is preferably contained in an amount of 30 parts by weight or more and 80 parts by weight or less with respect to 100 parts by weight of a sum of a total weight of the solid lubricant and a total weight of the binder resin excluding the curing agent.

A curing accelerator may be contained in the agent in an amount of 0 parts by weight or more and 10 parts by weight or less with respect to 100 parts by weight of a total weight of the epoxy resin constituting the prepolymer.

The curing agent is a curing agent to cure an epoxy resin, and is formed of an amine-based curing agent, an acid anhydride-based curing agent, a phenol-based curing agent, or a latent curing agent.

At this time, the epoxy resin constituting the prepolymer preferably has more than two epoxy groups (polyfunctional epoxy resin). The epoxy resin constituting the prepolymer preferably has six or less epoxy groups. The epoxy resin constituting the prepolymer more preferably has four or less epoxy groups.

The agent having the above composition preferably has a viscosity of 20 mPa·sec or more and 2,000 mPa·sec or less.

Figure 7A:
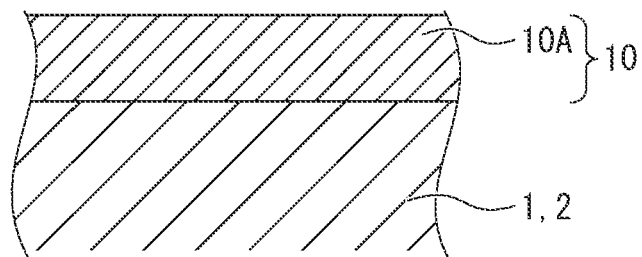
FIGS. 7A and 7B are diagrams illustrating a coating film structure.

The agent of the present embodiment is applied to a tightening surface of the thread and dried to form a solid lubricating coating film 10A (see FIG. 7A).

<Lubricating Coating Film Including Solid Lubricating Coating Film 10A>

The solid lubricating coating film 10A is formed by dispersing a solid lubricant in a binder resin as a matrix component.

The binder resin contains a prepolymer and a curing agent, and the prepolymer is polymerized with the curing agent and cured.

The prepolymer is formed of one or more epoxy resins. The prepolymer is contained in an amount of 70 parts by weight or more with respect to 100 parts by weight of the binder resin.

The epoxy resin constituting the prepolymer has an epoxy equivalent of 100 or more and 500 or less.

The epoxy resin constituting the prepolymer preferably has a glass transition temperature Tg of 100° C. or higher.

The solid lubricant contains boron nitride (BN) in an amount of 80% by weight or more. The BN has an average particle size of 10 µm or less.

A total weight of the solid lubricant is 0.1 times or more and two times or less a total weight of the binder resin.

The curing agent is a curing agent to cure an epoxy resin, and is formed of an amine-based curing agent, an acid anhydride-based curing agent, a phenol-based curing agent, or a latent curing agent.

At this time, the epoxy resin constituting the prepolymer preferably has more than two epoxy groups (polyfunctional epoxy resin). The epoxy resin constituting the prepolymer preferably has six or less epoxy groups. The epoxy resin constituting the prepolymer more preferably has four or less epoxy groups.

The solid lubricating coating film 10A of the present embodiment has a hardness of, for example, 3H or more.

The solid lubricating coating film 10A has a thickness of, for example, 10 µm or more and 150 µm or less.

Figure 7B:
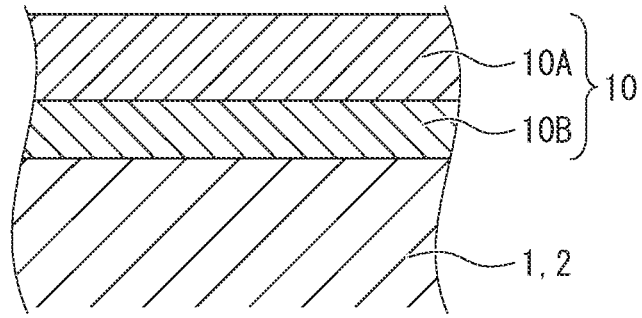

The lubricating coating film of the present embodiment may have a base layer 10B between a tightening surface of a thread portion and the solid lubricating coating film 10A (see FIG. 7B). The base layer 10B is formed of, for example, a chemical conversion-treated layer or an electroplated layer.

The lubricating coating film described above is formed on a tightening surface of a thread portion of at least one of the box and the pin.

Determination of Each Definition

The inventor has found that what is important is for solving the above problems is to control the following four ((a) to (d)) and matters related thereto in suitable ranges.
(a) Devising a suitable new laboratory test simulating make-up/break-out in an actual well, specifying upper and lower limits of each parameter for a solid lubricating coating film by a method of the new laboratory test, and specifying a suitable range thereof
(b) Specifying an optimal range of BN with reference to evaluation by the laboratory test in (a)
(c) Specifying an optimum range of a physical property value of an epoxy resin using the definition in (b)
(d) Further specifying suitable ranges related to these Here, the suitable method for simulating make-up/break-out in an actual well is a method for simulating a make-up behavior that occurs when a connection for oil country tubular goods is made up in an actual well. Using this, upper and lower limits of a parameter in the present embodiment are confirmed, and a suitable range is determined.

A lubrication state of a connection for oil country tubular goods is divided into two phases in each of a laboratory test and an actual well. Phase 1 is lubrication at the time of make-up/break-out in a state where threads are not engaged with each other, and phase 2 is lubrication at the time of make-up/break-out in a state where the threads are engaged with each other. Phase 1 corresponds to, for example, a region (x) in a torque turn chart of FIGS. 4A and 4B. Phase 2 corresponds to, for example, regions (y) and (z) in FIGS. 4A and 4B.

Figure 2A:
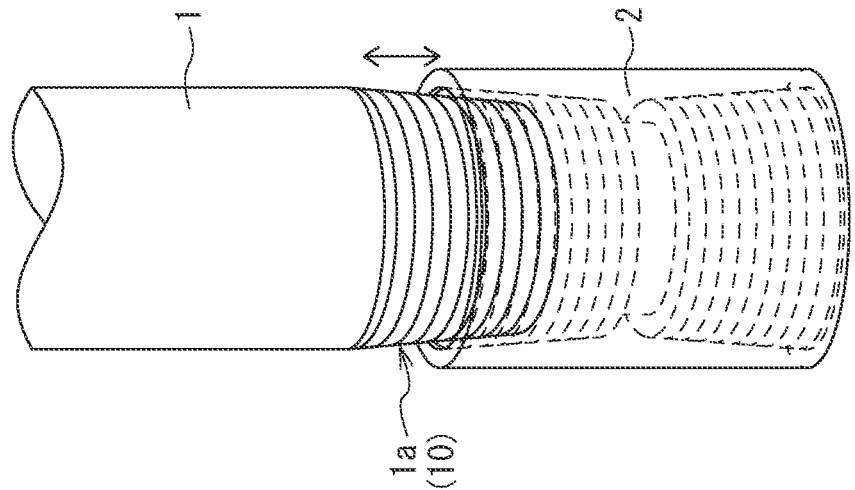
FIG. 2A is a diagram of a make-up chart in an actual well.
Figure 2B:
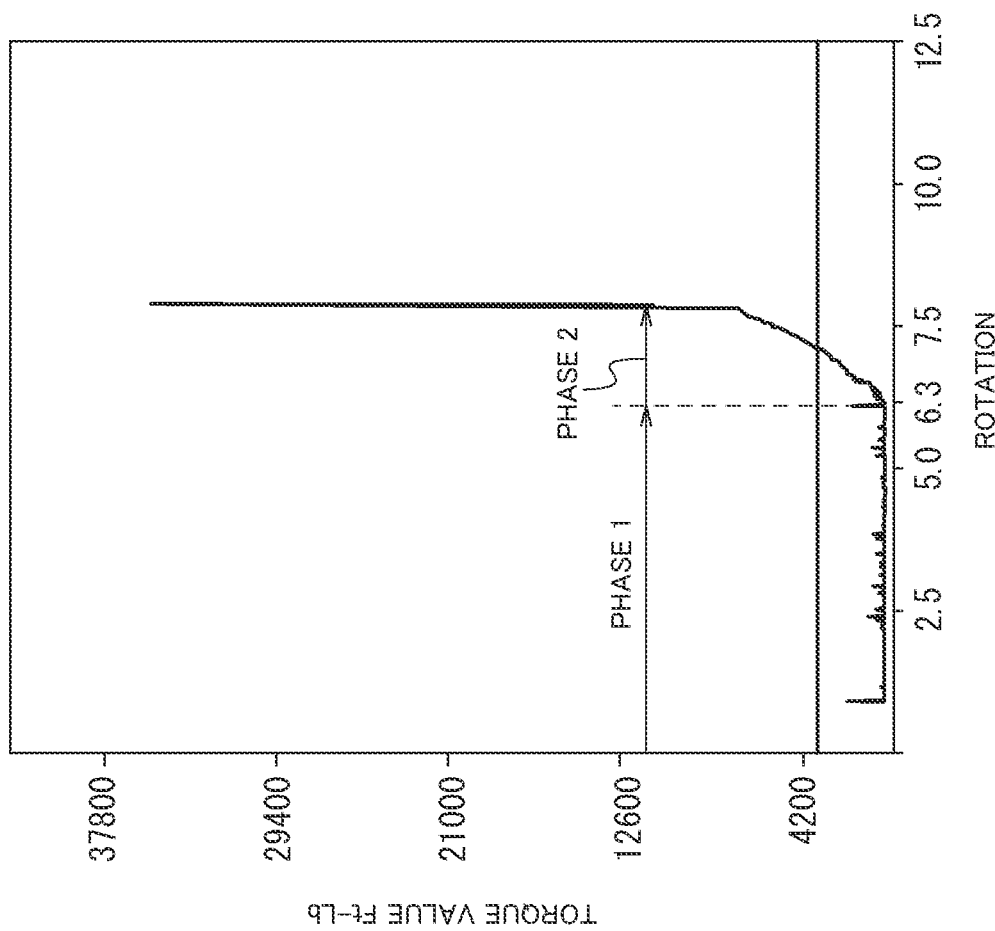
FIG. 2B is a diagram illustrating an initial set position at that time.
Figure 3A:
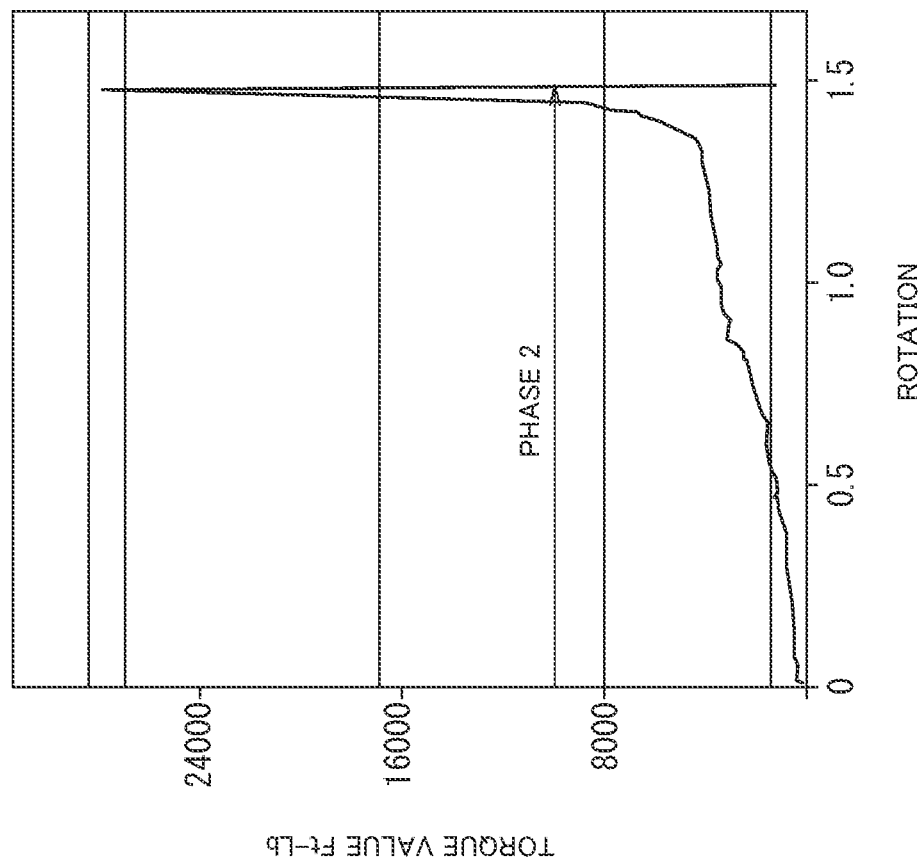
FIG. 3A is a diagram of a make-up chart in a conventional laboratory test.
Figure 3B:
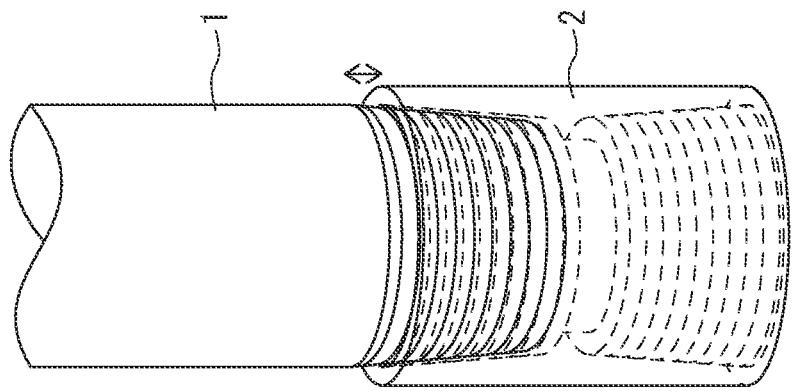
FIG. 3B is a diagram illustrating an initial set position at that time.

The former (phase 1) is eliminated if the connection is tightened up to a portion where the threads are engaged with each other by tightening by hand or the like at the time of starting connection make-up (example: FIGS. 3A and 3B). However, in many actual wells, simply inserting a pin into a box for setting is defined as a make-up starting position. Alternatively, thereafter, make-up the connection only by several rotations to only loosely fix the connection such that cross thread does not occur is defined as a make-up starting position. That is, in many actual wells, it is common to start make-up/break-out from a situation where threads are not engaged with each other (example: FIGS. 2A and 2B). Note that the cross thread refers to a situation where the connection is made up with threads at different levels or slid to original thread positions on the way of being closed.

In phase 1, a tong performs make-up/break-out at a high speed of 5 to 20 rpm. Meanwhile, when the connection is continuously made up, the threads start to be engaged with each other, and the phase shifts to phase 2. This shift causes a torque to slightly rise, and from there, make-up is performed slowly at a speed of approximately 0.5 to 2.0 rpm. For loosening, a reverse procedure to the make-up is performed.

These procedures are similarly performed when a conventional greasy compound is used as lubrication or when a solid lubricating coating film is formed as lubrication as in the present embodiment. As a condition of setting a connection at an initial position, a behavior for creating rattling is important. As a set position, it is important that about one to three or more threads are exposed with respect to a box connection at the time of initially make-up a pin connection when a behavior of a joint is considered.

<FIGS. 2A and 2B>

FIGS. 2A and 2B are examples in which an actual well is simulated as it is. That is, FIGS. 2A and 2B are make-up charts (torque turn chart) when a make-up test is performed using a 40 feet (=12 m) actual length pin as a pin and using a solid lubricating coating film for lubrication.

Test conditions in FIG. 2A will be described. As an example, as the solid lubricating coating film, a film obtained by dispersing $MoS_2$ as a solid lubricant in a binder resin of polyamideimide (PAI) is used.

FIGS. 2A and 2B are examples of simulating a situation often performed in an actual oil field/gas field. That is, this is an example in which make-up is started from a situation where threads are not sufficiently engaged with each other as illustrated in FIG. 2B as an initial set position at the time of starting connection make-up. That is, as illustrated in FIG. 2B, this is an example in which make-up is started from a state where about a half of pin connection is exposed at the time of starting initial make-up. The state where the threads are not engaged with each other is not caused by intentionally stopping tightening by hand. When it is tried to set the pin connection to a box connection by tightening by hand, the pin connection inevitably stops halfway. This means that the connection cannot be tightened any more by hand. A long and heavy actual length pin is not exactly upright with respect to the box connection unlike a theoretical case. When the pin is looked up from below, it is very common that the pin is slightly bent and cannot be tightened any more by hand.

The pin used is a 9⅝"53.5 #Q125 JFELION™ connection, and has a length of approximately over 40 feet. FIG. 2A is a chart when a joint is made up while the pin is hung by a crane which hangs the entire length of the pin from a rig. It can be seen that the example of the torque turn chart of FIG. 2A is a situation that often occurs in an actual well.

What is notable in FIG. 2A is a region before a point at which a torque continuously increases (rotation number is 0 to about 6.3 rotations: corresponding to phase 1). In this region, the torque should not stand in principle, but actually, as illustrated in FIG. 2A, it can be confirmed that a spike-shaped torque tends to stand frequently in a non-regular manner. This suggests that the pin connection is irregularly and locally in contact with the box connection while rotating. This is a situation that occurs in actual make-up.

This means that destroy or peeling of a solid lubricating coating film is unavoidable to some extent depending on design or optimization of the solid lubricating coating film.

Here, what is notable is that the chart of FIG. 2A does not intentionally create a worst state as a condition, but rather is a torque turn chart for a very common sample with a solid lubricating coating film.

<FIGS. 3A and 3B>

FIG. 3A is a torque turn chart when the same solid lubricating coating film as that in FIGS. 2A and 2B is used and make-up is performed with a vertical power tong.

In FIGS. 3A and 3B, a pin having the same outer diameter, thickness, and connection type as that in FIGS. 2A and 2B is adopted, but a short pin having a length of about 1 m is adopted as the pin.

FIG. 3A is a make-up chart (torque turn chart) when make-up is started from a state where threads are sufficiently engaged with each other. That is, FIG. 3A is a make-up chart (torque turn chart) when about one to three pin threads are exposed at the time of starting initial make-up as illustrated in FIG. 3B.

The condition of FIG. 3A is also a condition often used at the time of make-up in a conventional laboratory test, and is a case where a connection is set until the threads are engaged with each other by tightening by hand and then the make-up test is performed.

In FIG. 3A, it is necessary to pay attention to a point that the unit of the horizontal axis is different from that in FIGS. 2A and 2B.

In FIG. 3A, make-up by a tong is started from a state where tightening by hand is performed to a state where the threads are engaged with each other, and thus, a spike-shaped torque as seen in FIG. 2A is not observed. That is, it has been found that it can be understood that examining a lubrication characteristic of the solid lubricating coating film in only phase 2 without passing through phase 1 corresponds to the conventional laboratory test.

As can be seen from FIGS. 3A and 3B, in the conventional laboratory test, destroy of the solid lubricating coating film, which often occurs in phase 1, does not occur, and make-up occurs from a state where the threads are sufficiently engaged with each other, that is, from a region where surfaces of the threads start to come into contact with each other.

Figure 4A:
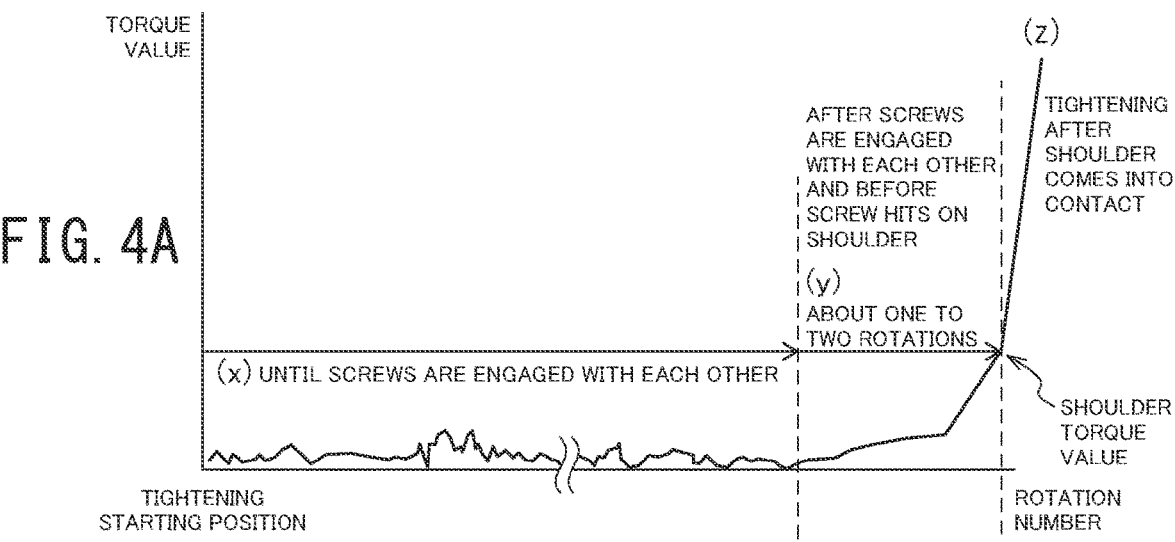
Figure 4B:
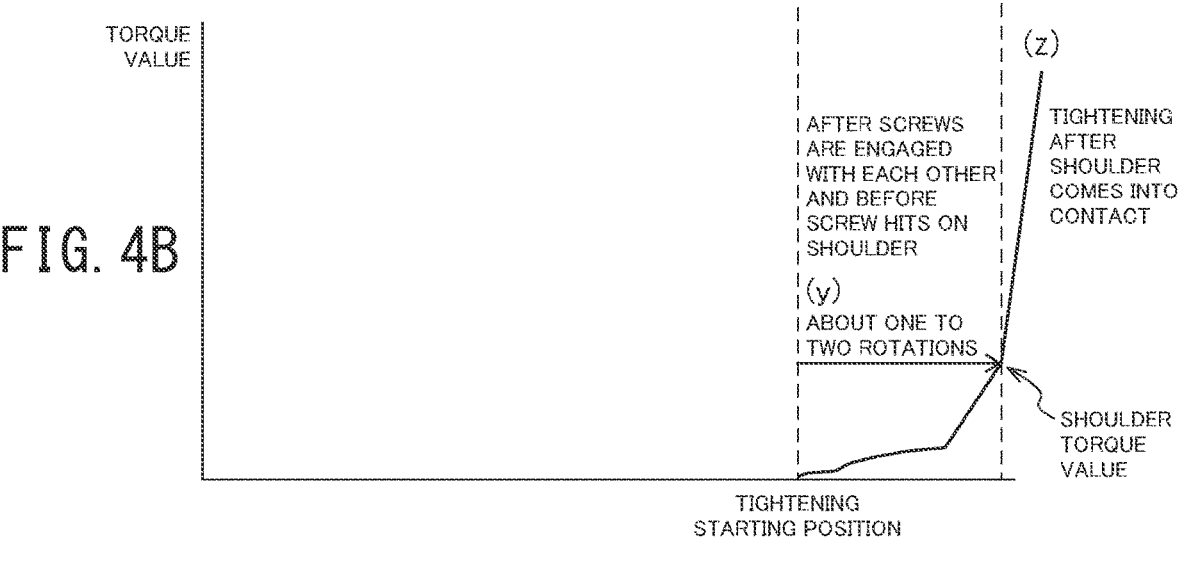

<FIGS. 4A and 4B>

FIGS. 4A and 4B illustrate FIGS. 2A and 3A in a state where FIGS. 2A and 3A can be easily compared with each other.

FIG. 4A is the case of FIGS. 2A and 2B, and FIG. 4B is the case of FIG. 3.

According to the study of the inventor, considering use in an actual well, for an ideal solid lubricating coating film, the solid lubricating coating film is preferably not destroyed in the region of (x) in FIG. 4A, and concerns about destroy and peeling are preferably minimized. Alternatively, a spike may be allowed to slightly stand. In addition, it is preferable to design the solid lubricating coating film such that a secondary product derived from the destroyed or peeled solid lubricating coating film does not clog a thread gap in a make-up/break-out process even in a situation where the solid lubricating coating film is damaged, and conversely, adheres well to the threads to assist lubrication.

For this purpose, it is important to control the film quality of the solid lubricating coating film so as to be hard to a predetermined hardness or more. As a method for evaluating the hardness, pencil hardness, which is a hardness index based on scratch, can be exemplified. However, when a lubricating coating film is formed, it is preferable to suppress the viscosity of an agent for the solid lubricating coating film to such a low degree that spray coating or brush coating can be performed, and to be able to apply the agent without unevenness in film thickness. Furthermore, during a firing step (during a curing step), constituent components of the solid lubricating coating film are preferably formed into a single and smooth film with surface tension by a rubber-liquid behavior.

In addition, in a study evaluation method of the laboratory test of the present embodiment, it is preferable to perform evaluation by a new laboratory test having the following conditions (1) to (6) for the purpose of simulating a make-up/break-out behavior in an actual well. Note that an apparatus configuration example of the actual laboratory test will be described later.

(1) A heavy bob having a weight corresponding to 1 to 3 actual size pins is set on an upper portion of a short pin.
(2) As initial set positions of the short pin connection and a box connection, about a half of pin threads are set, for example, a half of the pin threads are exposed, that is, the short pin connection is weakly fixed, and a make-up/break-out test is started.

(3) From the state of "(2)", make-up is started at high speed rotation of 15 rpm, and make-up is continued until a torque of a predetermined value or more is detected.
(4) When the torque rises, the rotation is temporarily stopped, and make-up is performed by low speed rotation of 1 rpm (make-up is completed).
(5) Break-out is performed in a reverse step.
(6) When the short pin connection is completely removed, a surface of the pin thread and a surface of the box connection are observed (air blown part is observed depending on a situation) to determine whether or not an abnormal event such as seizure has occurred. If there is no problem, "(2)" and the subsequent steps are repeated.

If slight seizure occurs in a thread portion (seizure in a sealed portion is NG regardless of the degree of seizure), the thread portion is amended, and if necessary, a solid lubricant for repair is applied to the thread portion, and "(2)" and the subsequent steps are repeated.

In the present embodiment, a lubrication characteristic of the solid lubricating coating film was newly evaluated based on this evaluation method, and suitable conditions for the solid lubricating coating film were selected (see Examples).

Here, it is recognized that the conventional laboratory test targets lubrication after the threads are engaged with each other (situations in the region of (y) and the region of (z) in FIGS. 4A and 4B) as determined from results of many make-up/break-out tests (laboratory tests) in past literature. The conventional laboratory test is considered to have superiority and inferiority of the lubrication characteristic based on lubrication after the threads are engaged with each other, that is, a state where the solid lubricating coating film is satisfactory in a state where the state in the region (x), that is, a situation where the torque rises in a spike shape is not considered. That is, the conventional laboratory test looks as if the conventional laboratory test performed make-up/break-out from a position where the connection was sufficiently set by tightening by hand to a portion where the threads were engaged with each other in the evaluation using a short pin and a horizontal tong or a vertical tong. In PTLs in which the number of times of make-up/break-out is clearly described, there is a description that the number of times of make-up break-out can be 10 for a small diameter size by make-up in an actual well. However, in both evaluation with a short pin and evaluation in an actual well, if the initial set position (make-up start position) starts from a position where threads are sufficiently engaged with each other, the number of times of make-up break-out seems to be a possible number.

Meanwhile, in past literatures, it is sometimes described that the number of times of make-up/break-out can be up to 15 to 20 by make-up/break-out based on a solid lubricating coating film for a large diameter size of 9⅝" or 13⅜". However, in make-up/break-out in an actual well, that is, when an actual size pin has its own weight and make-up/break-out are performed from a state where the threads are not engaged with each other, it seems that this number is almost impossible in a case of a large diameter using a solid lubricating coating film.

It goes without saying that simulating an actual make-up/break-out situation is important for evaluating the lubricity of the solid lubricating coating film. In a situation where there is rattling until the threads are engaged with each other, it is necessary to perform evaluation based on a state where the solid lubricating coating film is peeled or damaged. In the present embodiment, various definitions are made with reference to results of a new laboratory test that can be evaluated in consideration of such conditions.

Conditions for the solid lubricating coating film of the present embodiment are defined with reference to the results of the new laboratory test on the premise that the solid lubricating coating film is a solid lubricating coating film in which BN as a main component of a solid lubricant is dispersed in a binder resin containing an epoxy resin film as a main component.

Furthermore, each definition will be described in detail.

<Basic Composition of Solid Lubricating Coating Film, Film Thickness, and Film Structure>

In the present embodiment, the solid lubricating coating film is formed by dispersing a solid lubricant mainly containing BN in an epoxy resin cured coating film. In particular, it is preferable to obtain a pencil hardness of 3H or more.

In the present embodiment, BN is selected as a main component of the solid lubricant in order to obtain a film capable of achieving high lubrication, and to obtain a film capable of maintaining high lubrication even at a high temperature. That is, at the time of make-up/break-out, a pin connection and a box connection not a little rub against each other to generate frictional heat. BN is selected in order to maintain sufficient lubrication even at that time.

In the present embodiment, an epoxy resin coating film is selected as the binder resin. The epoxy resin coating film is selected because the epoxy resin coating film is easily handed and less expensive than other agents. Furthermore, the epoxy resin coating film is selected because the epoxy resin coating film is a well-balanced material, and the epoxy resin coating film makes it easy to obtain a hard film targeted by the present embodiment or a film having excellent heat resistance by selecting an appropriate "epoxy resin agent in a narrow sense" and curing agent. In addition, the epoxy resin coating film is selected because the epoxy resin coating film has many excellent advantages, for example, the epoxy resin coating film is excellent in adhesion/bonding, may be formed without a base layer (Mn phosphate chemical conversion-treated film, electroplated film, or the like), and does not significantly contract during curing.

As for the film thickness of the coating film, it is necessary to form a film having at least a film thickness of 10 μm in order to maintain a lubrication characteristic and corrosion resistance. An upper limit of the film thickness is set to 150 μm although it is difficult to say the upper limit unconditionally because a gap between a box connection and a pin connection varies depending on the type and design of a connection for oil country tubular goods.

Here, since many connection for oil country tubular goods are designed such that an upper limit of a gap between threads is about 100 to 200 μm, the upper limit of the film thickness is specified as 150 μm or less. The film thickness is more preferably 10 to 50 μm. There may be a gap of 100 to 200 μm between a thread and a root of a male thread and a female thread as described above. However, a gap between a stabbing and a flank in a male thread and a female thread and a gap between a load and a flank change between the time of make-up and the time of break-out. When the gap is narrowed, the film is substantially in close contact. Therefore, the film thickness is preferably small, and the film thickness is preferably 10 to 50 μm.

However, the film thickness means a film thickness in an As-formed state before the first make-up. At the time of make-up/break-out, in reality, the binder resin is somewhat scraped, and the film thickness applied at room temperature actually results in a thin film due to crushing of the film. Therefore, even if there is a thickness equal to or larger than a gap assumed in a threaded surface, a problem such as seizure does not occur for this reason.

The epoxy resin may be formed directly on a threaded surface, or a base layer may be formed between the threaded surface and the epoxy resin. Examples of the base layer include a Mn phosphate chemical conversion-treated layer and a metal plated layer including a Cu plated layer. Although there are various opinions and it is hard to say that it is theoretically determined, an OH group in the epoxy resin can form a film having strong adhesion by hydrogen bonding or the like with a metal surface. The above OH group is an OH group in the epoxy resin film such as polyhydroxyether or polyhydroxylamine. For this reason, even when there is no surface-treated layer as a base or even when there is a surface-treated layer (use of an anchor effect or the like can be expected in some cases), it is considered that there are few problems in adhesion.

<Solid Lubricant>

The present embodiment targets one in which a solid lubricant containing boron nitride (BN) as a main component is dispersed in a binder resin.

[Solid Lubricant]

A range of BN as the solid lubricant having a remarkable lubrication improving effect has been clarified using the above new laboratory test method. That is, by studying various lubricating coating films in which BN is dispersed in an epoxy resin as a binder resin using the above new laboratory test method, the range of BN having a remarkable lubrication improving effect has been clarified.

Here, a highly lubricated state cannot be necessarily created by using boron nitride (BN) as the solid lubricant.

As for BN, it has been found that when a BN-based component system containing BN in amount of 808 or more with respect to the total weight of the solid lubricant as a denominator is used, and BN having an average particle size of 0.1 to 10 µm is selected, a remarkable effect is obtained.

The size of BN is preferably as smaller as possible. However, since an average particle size lower limit of commercially available BN is 0.1 µm, a lower limit of BN is set to 0.1 µm. An upper limit was determined experimentally, and it has been confirmed that excellent lubricity is exhibited up to 10 µm.

In a case of a lubricant formed by overlapping in a sheet shape or when an average particle size is larger than 10 µm, a strong crystal structure of a two-dimensional surface such as BN achieves lubrication in such a manner that a sheet-shaped structure slides. At this time, adjacent sheet-shaped structures are extended so as to overlap each other. As a result, a white tape-shaped secondary product is formed. Then, since the secondary product is formed to be thick, there is a high tendency that a thread gap is clogged with the secondary product, and therefore a concern of seizure increases. In general, the smaller the average particle size is, the less overlapping occurs, and formation of the white tape-shaped secondary product can be suppressed. Therefore, it is considered that high lubrication can be achieved.

From this, containing BN in amount of 80% or more with respect to the total weight of the solid lubricant as a denominator, and BN having an average particle size of 10 µm or less are defined as constituent elements of the present invention.

The meanings of these definitions are as follows. A highly lubricated state cannot be necessarily created with boron nitride (BN) in a broad sense. This means that optimal and remarkably high lubricity can be expected when BN is used in this range in order for BN dispersed in the epoxy resin as the binder resin in the present embodiment in a use environment of a connection for oil country tubular goods to achieve high lubricity.

Here, BN has a strong crystal structure in a two-dimensional sheet surface direction as in $MoS_2$ and graphite, and the two-dimensional sheet surfaces are connected to each other by a weak intermolecular force in the Z-axis direction. When a force is applied to BN, sheet surfaces thereof slide with each other to achieve lubrication.

In the present embodiment, the expression that the content of BN is 80% or more means that BN is a main component of the solid lubricant. The content of BN is specified to 80% or more so as to mean that even if another solid lubricant is contained at a ratio of 20% or less, there is no bad influence on a BN-based design.

In the present embodiment, the more BN as a material constituting the solid lubricant, the better. Since lubricity may be deteriorated due to mixing of other components, the content of BN is set to 80% or more as a range of handling BN as a main component. The content of BN is preferably 90% or more.

The smaller the average particle size of BN, the better. Note that the average particle size is a parameter that means a particle size at an integrated value of 50% in a particle size distribution obtained by a laser diffraction/scattering method or the like.

The upper limit of the average particle size of BN is set to 10 µm because when the average particle size of BN is larger than 10 µm, there is a high concern that the binder resin film may be destroyed and thoroughly peeled off due to the large particle size of BN. That is, one that has been peeled off from the solid lubricating coating film is pressed during make-up/break-out to form a secondary product. However, when each BN having a sheet-shaped structure is deformed so as to slide on a sheet surface, BNs having sheet-shaped structures close to each other overlap each other, and finally, a strong white tape-shaped secondary product is formed. Then, since the secondary product is formed to be thick, the secondary product cannot move following make-up/break-out, and a concern of seizure increases. In general, the smaller the average particle size of BN is, the less overlapping occurs, and formation of the white tape-shaped secondary product can be suppressed. As a result, it is considered that high lubrication can be achieved. At present, since an average particle size lower limit of commercially available BN is 0.1 µm, a lower limit of BN is considered to be around 0.1 µm. However, the present embodiment also includes BN having an average particle size of 0.1 µm or less obtained by development of technology.

In addition, as industrial types of BN, there are scaly BN and particulate BN. In the present embodiment, any type may be used. BN is preferably granulated.

A solid lubricant other than BN may be mixed under a condition that the content thereof is 20% or less as described above. Any type of other solid lubricant may be used, and examples thereof include polytetrafluoroethylene (PTFE: Teflon (registered trademark)), graphite, fluorographite, $MoS_2$, $WS_2$, melamine cyanurate (MCA), mica, and talc. An oil-based substance may be mixed as one type of solid lubricant under a condition that the content thereof as the solid lubricant is 20% or less. For example, carnauba wax, perfluoropolyether (PFPE) oil, chlorotrifluoroethylene (CTFE) oil (low polymer of chlorotrifluoroethylene), or the like may be mixed. Lubrication of BN can be maintained or improved.

<Epoxy Resin Constituting Binder Resin>

In the present embodiment, an epoxy resin film is selected as the binder resin.

In the present embodiment, one containing an epoxy resin in an amount of 70 parts by weight or more with respect to 100 parts by weight of a total amount of a resin other than the epoxy resin constituting the binder resin and the epoxy resin as the prepolymer is selected. Furthermore, as the epoxy resin, an epoxy resin having an epoxy equivalent of 100 or more and 500 or less is selected.

Furthermore, in the present embodiment, the solid lubricating coating film is preferably a hard film. In order to achieve this, a curing agent is selected and design is performed so as to obtain an epoxy resin coating film having a strong three-dimensional network structure. For example, an epoxy resin as the prepolymer having more than two epoxy groups (polyfunctional epoxy), a curing agent having more than two functional groups, or an epoxy resin having more than two epoxy groups and a curing agent having more than two functional groups are selected. This makes it possible to form a three-dimensionally copolymerized film and to impart heat resistance.

The term "heat resistance" as used herein means that when even slight seizure occurs at the time of connection make-up, a portion where friction strongly occurs may generate heat, and the epoxy resin is prevented from being destroyed by the heat generation.

The epoxy equivalent is selected to be in a range of 100 to 500 because the film is made hard by increasing a crosslinking density. This also means increasing the concentration of epoxy groups, which is performed in order to suppress the epoxy equivalent to a low value in other words.

Here, when the epoxy equivalent exceeds 500, the film quality is inevitably soft. In addition, it is difficult to impart heat resistance that can be exhibited at the time of make-up/break-out. The lower limit value of the epoxy equivalent is set to 100 because the lower limit value is specified as an approximate limit value of a distributed epoxy resin. When an epoxy material having smaller epoxy equivalent is formed, the epoxy equivalent is not limited to 100, and selection of an epoxy material having a lower epoxy equivalent is included in the present embodiment.

The epoxy resin as used herein means an epoxy resin as a coating film obtained by copolymerizing an "epoxy resin in a narrow sense" as a prepolymer with a curing agent. The epoxy resin is selected because the epoxy resin has excellent advantages, for example, the epoxy resin is excellent in adhesion/bonding, water resistance/moisture resistance, and heat resistance, and does not significantly contract during curing. Furthermore, the epoxy resin is selected because the epoxy resin is a well-balanced material, for example the epoxy resin is easily handled and less expensive than other agents.

In particular, among the binder resins, the present embodiment aims at a hard film, selects an appropriate curing agent, and selects a hard epoxy resin coating film having a pencil hardness of 3H or more. The binder resin is a matrix that holds a BN-based solid lubricant, and forms a main composition of the solid lubricating coating film together with BN.

A reason why a hard epoxy resin film is favorable for lubricity (make-up/break-out characteristic) is as follows.

In lubrication of a connection for oil country tubular goods using the solid lubricating coating film, when there is rattling until threads are engaged with each other, the solid lubricating coating film tends to be damaged not a little. However, the solid lubricating coating film tends to withstand the damage. Even after the threads are engaged with each other, the connection is made up while the weight of a normal connection for oil country tubular goods having a length of about 8 to 12 m is applied to the threads. For this reason, a structure in which lubrication is maintained while the solid lubricating coating film is slightly scraped can be inevitably obtained. Therefore, if the pencil hardness is not set to 3H or more, the solid lubricating coating film is largely damaged, and there is a real situation that the solid lubricating coating film can withstand only zero to several times of make-up/break-out.

From the above, in the present embodiment, the "epoxy resin in a narrow sense" is contained in an amount of 70 parts by weight or more in the agent forming the binder resin with respect to 100 parts by weight of a sum of the group of "epoxy resin in a narrow sense" excluding the weight of a curing agent component and a lubricant component as another component, which makes the epoxy resin a main component. In addition, an epoxy resin having an epoxy equivalent of 100 or more and 500 or less is selected. This is for increasing the number of crosslinking points (increasing a crosslinking density) to form a strong coating film.

Even if the "epoxy resin in a narrow sense" as the prepolymer has two epoxy groups, a three-dimensional structure can be formed. However, as a more preferable range, a polyfunctional epoxy resin having more than two epoxy groups is preferable. The meaning of "polyfunctional" epoxy means that the number of epoxy groups in one molecule is more than two on average. This means that the number of epoxy groups is larger than that of a "normal epoxy resin" containing two epoxy groups. Since the polyfunctional epoxy can be further three-dimensionally crosslinked in a reaction with the curing agent, the film quality can be hardened (pencil hardness can also be hardened) because the crosslinked network is strengthened when (co) polymerized.

At the same time, the polyfunctional epoxy has a higher glass transition temperature (Tg), and therefore has excellent heat resistance. Note that a polyfunctional epoxy preferably has Tg of higher than 100° C. as a suitable range so as to have excellent heat resistance. The number of epoxy groups in one molecule is preferably 2 or more to 6 or less, and a more suitably more than 2 and 4 or less. This is for suppressing peeling and preventing thorough destroy due to hardening of the solid lubricating coating film at an initial stage of make-up and a final stage of break-out. At the initial stage of make-up and the final stage of break-out, the threads are not engaged with each other, that is, there is rattling, and the solid lubricating coating film is easily destroyed. There is a high concern that an epoxy resin having more than six epoxy groups may cause steric hindrance in a reaction between the epoxy group and the curing agent. In this case, copolymerization between the epoxy resin and the curing agent may take too long time, and there is a possibility that a hard film cannot be necessarily obtained. Therefore, an epoxy resin having six or less epoxy groups is used. Meanwhile, even when a bifunctional epoxy resin and a curing agent having more than two functional groups are used, a three-dimensional network structure is formed, and therefore the film quality can be cured. When both the epoxy resin and the curing agent are polyfunctional at the same time, a harder three-dimensional network is formed, which is preferable.

The epoxy equivalent of 100 or more and 500 or less is specified as a suitable range. The epoxy equivalent is a value obtained by dividing the molecular weight of an epoxy resin in a narrow sense as a prepolymer by the number of epoxy groups. The epoxy equivalent can be regarded as a molecular weight linked and constrained at a crosslinking point. The epoxy equivalent is specified in the above range because the smaller the epoxy equivalent, the higher the crosslinking density and the higher the hardness.

The prepolymer is exemplified. Examples of a bifunctional epoxy resin as the prepolymer include a bisphenol A type epoxy resin, a bisphenol F type epoxy resin, and a bisphenol C type epoxy resin. Examples of a polyfunctional epoxy resin having more than two functional groups include a phenol novolac type compound, a cresol novolac type epoxy compound, an aliphatic epoxy compound, a glycidyl ester type epoxy resin, a glycidyl amine type epoxy resin, a polyfunctional phenol type epoxy resin compound, and derivative groups thereof. These may be used singly or in combination.

In the present embodiment, the "epoxy resin in a narrow sense" is contained in an amount of 70 parts by weight or more in the agent forming the binder resin with respect to 100 parts by weight of a sum of the group of "epoxy resin in a narrow sense" excluding the weight of a curing agent component and a lubricant component as another component. That is, this makes the epoxy resin a main component. As a more preferable range, it is desirable that the polyfunctional epoxy resin is contained in an amount of 70 parts by weight or more with respect to 100 parts by weight of the total weight of the "epoxy resin in a narrow sense".

The former expression "epoxy resin is contained in an amount of 70 parts by weight or more" is as follows. The present embodiment targets a hard film having a pencil hardness of 3H or more as described above. However, when a hard film is selected with an epoxy resin, brittleness often occurs together. Therefore, the expression "epoxy resin is contained in an amount of 70 parts by weight or more" means that another binder resin component may be contained under a condition that the content of the another binder resin component is less than 30 parts by weight. In order to obtain a hard film, it is preferable to strengthen a three-dimensional network structure. Therefore, the content of the polyfunctional (having more than two epoxy groups) epoxy resin is specified to 70 parts by weight or more. A thermoplastic resin may be selected as another binder resin component under a condition that the content of the thermoplastic resin is less than 30 parts by weight in order to avoid the binder resin formed of the epoxy resin from becoming too hard and brittle.

The epoxy resin coating film as a final material formed by (co) polymerization between the prepolymer and the curing agent is inevitably brittle when adjusted to be hard. In order to avoid this brittleness, a suitable agent is prepared as an agent for a monopolymer epoxy resin. Alternatively, a resin obtained by introducing a strong skeleton such as a benzene ring or a molecular chain into a main chain of an epoxy resin may be used. At this time, in some cases, a flexible chain may be introduced by rubber modification, fluorene modification, urethane modification, or the like of the epoxy resin itself. This is intended to improve toughness by introducing a point for reducing internal stress into the epoxy resin coating film. Alternatively, adjustment may be performed by introducing a thermoplastic polymer in an amount of less than 30 parts by weight. This is intended to improve toughness by a cavitation effect or the like by introducing a thermoplastic polymer into the epoxy resin coating film. The thermoplastic polymer as used herein is not particularly limited. As the thermoplastic polymer, for example, polyacetal (POM), polycarbonate (PC), polyphenylene sulfide (PPS), or polytetrafluoroethylene (PTFE) (Teflon (registered trademark)) is allowed to be contained.

Note that the weight blending amount of the epoxy resin is expressed in parts by weight instead of % by weight or the like for the following reason. Basically, in each agent for the epoxy resin as the prepolymer, one active hydrogen reacts with one epoxy group. Note that when the curing agent is an amine, one active hydrogen corresponds to almost an amine equivalent. Therefore, a weight mixing ratio is determined by the epoxy equivalent of each prepolymer and the active hydrogen equivalent of the curing agent. Therefore, the number of combinations between the epoxy resin and the curing agent is infinite. On the other hand, the weight blending amount of the epoxy resin is proportional to the amount of the epoxy resin after curing. For this reason, the mixing ratio is not clear unless expression is made using the weight blending amount of the epoxy resin as the prepolymer. Therefore, the weight blending amount of the epoxy resin is defined using parts by weight.

However, in a case of a latent curing agent, the curing agent itself is unnecessary in a true sense. For example, this is a case where the epoxy resin itself as the prepolymer is self-polymerized by an anionic polymerization catalytic reaction of the latent curing agent. Examples of the latent curing agent include imidazole, a tertiary amine, dicyandiamide, and low-temperature and fast-curing polymercaptan. When these latent curing agents are used, polymerization is not necessarily performed at a ratio of 1:1. However, in the present specification, definition is performed using the parts by weight of the epoxy resin as the prepolymer as a parameter for specifying the characteristics of the epoxy resin.

Here, it is preferable to form a coating film by applying an agent with a brush or mechanically applying an agent at room temperature. Therefore, the agent needs to be liquid in a room temperature range. In addition, in consideration of convenience, the agent is preferably a one-liquid type rather than a two-liquid type. In addition, the agent is preferably heat-treated and thereby copolymerized to form a film without being immediately solidified after being applied to a thread surface.

If the viscosity of the agent is too low, the agent drips along a thread immediately after the agent is applied to a thread portion. In a case of a female thread, there is a high concern that the agent may be accumulated and stay at a six o'clock position, and the film thickness may be increased only in that portion. Also in a case of a male thread, droplets of the agent may fall at a six o'clock position, and it may be difficult for the agent to be homogeneous in a state before the heat treatment. Meanwhile, when the viscosity of the agent is too high, the agent cannot be applied with a brush. In addition, application by spraying is not suitable because clogging and the like occur. Therefore, a preferable range of the viscosity of the agent is 200 cps or more and 900 cps or less (0.2 Pa·sec or more and 0.9 Pa·sec or less). However, even when the viscosity of the agent itself is too high beyond this range, an agent having a decreased viscosity by adding a reactive diluent is included in the present embodiment.

<Curing Agent for Epoxy Resin>

In the present embodiment, the curing agent means an agent that contributes to a crosslinking reaction between crosslinking groups of the "epoxy resin in a narrow sense" as the prepolymer.

The curing agent is not particularly limited, and any curing agent generally known as an epoxy resin curing agent can be used. The curing agent is not particularly specified as long as the above-described hard epoxy resin coating film having a pencil hardness of more than 3H is achieved by selection of the epoxy resin in a narrow sense and selection of the curing agent.

Examples of the curing agent include, as an amine-based curing agent, an aliphatic amine, a polyether amine, an alicyclic amine, and an aromatic amine. An epoxy resin formed with these curing agents is polyhyroxyamine. Examples of an acid anhydride-based curing agent include dodecenyl succinic anhydride, polyadipic anhydride, tetrahydrophthalic anhydride, trialkyltetrahydrophthalic anhydride, and phthalic anhydride. An epoxy resin formed with these curing agents is polyester. Examples of a phenol-based curing agent include a dihydroxyphenyl-based curing agent, and an epoxy resin formed with these curing agents is polyhydroxyether. Examples of the latent curing agent include an amine-based curing agent such as a tertiary amine or an aromatic amine, imidazole, and a halogenated boron amine complex, and examples of an epoxy resin include polyether.

The amount of the curing agent excluding the latent curing agent is based on mixing an amount defined by the active hydrogen equivalent of each curing agent with the epoxy equivalent of the epoxy agent in a narrow sense. Note that when the curing agent is an amine, the active hydrogen equivalent of each curing agent corresponds to almost an amine equivalent. Meanwhile, since the amount of the latent curing agent to be added is changed in conjunction with a reaction speed, it is only required to determine the blending amount appropriately each time.

In the present embodiment, basically, a hard coating film having a pencil hardness of 3H or more is formed. Therefore, it is preferable to use a thermosetting curing agent without using a curing agent that cures a resin at room temperature. With the former curing agent, the coating film has a low glass transition temperature Tg, and has a soft film quality. With the latter curing agent, the coating film has a high glass transition temperature Tg, and is often excellent in heat resistance and mechanical strength.

<Curing Accelerator for Epoxy Resin>

A curing accelerator may be used in a reaction between the epoxy resin in a narrow sense and the curing agent.

Although there is an exception, when the curing agent is an aromatic amine, a curing reaction proceeds when the curing agent is heated, but in many curing agents, the reaction does not proceed even when the curing agents are heated. In this case, a curing accelerator may be used.

When an acid anhydride-based curing agent, a phenol-based curing agent, or a dicyandiamide-based latent curing agent is selected as the curing agent, curing cannot be performed in most cases unless a curing accelerator is used.

Examples of the curing accelerator include a tertiary amine and tertiary amines such as diazabi-cycloundecene (DBU) or diazabi-cyclononene (DBN), an imidazole-based agent, phosphine, and a triphenylphosphine (TPP) such as a phosophonium salt. The addition amount of the curing accelerator is, for example, 0.01 to 10 parts by weight with respect to 100 parts by weight of the epoxy resin in a narrow sense (the epoxy resin constituting the prepolymer). However, it is necessary to amend the addition amount according to a situation. The addition amount is desirably 0.1 to 3 parts by weight.

<Other Additives>

In the present embodiment, the coating film is formed by dispersing a solid lubricant mainly containing BN in an epoxy resin cured film. However, it is preferable to obtain a hard film (pencil hardness of 3H or more). Therefore, a main object is to obtain a hard epoxy resin coating film. In addition, a glass fiber or a carbon fiber may be added in order to harden the film quality. In addition, the resin composition of the present embodiment may further contain a surfactant, an emulsifier, an elasticity reducing agent, a diluent, an antifoaming agent, an ion trapping agent, and the like.

<Method for Analyzing Film Hardness>

In the present embodiment, the pencil hardness of a hard film is evaluated. Specifically, the pencil hardness is measured by a method specified in JIS K 5600 May 4 (1999). It is clearly described in the JIS standard that this standard is a translation of the "ISO/DIS 15184, Paints and varnishes-Determination of film hardness by pencil test" standard. However, the pencil hardness test method itself is evaluated based on the definition in the JIS standard. The film hardness is evaluated with the pencil hardness because this is an evaluation of "scratching" with a pencil, and is a method for evaluating a film hardness caused by "scratching", which is similar to a behavior that the solid lubricating coating film is peeled off in a male thread and a female thread of a connection for oil country tubular goods. Rockwell, Vickers, Shore, and Knoop, which are film hardness measurement methods caused by indentation and sometimes used in a coating film or the like, are not suitable for a thin coating film and affect a base layer. Therefore, the pencil hardness is used in the present embodiment.

<Surface on which Solid Lubricating Coating Film is Formed>

The solid lubricating coating film of the present embodiment is used while the coating film is formed on one or both of a coupling side (female thread side) and a pin side (male thread side) in a connection for oil country tubular goods. Alternatively, the solid lubricating coating film of the present embodiment is preferably used while the solid lubricating coating film of the present embodiment is formed on one of the coupling side (female thread side) and the pin side (male thread side), and a softer film which is a different type from the coating film is formed on the other side.

In the latter case, the pencil hardness of the different type of soft film formed on the side where the coating film of the present embodiment is not formed is more preferably 4B or less. Since the epoxy resin coating film of the present embodiment is a hard film having a pencil hardness of 3H or more, the film hardness of the different type of soft film brings about a preferable lubrication characteristic by having a film structure with a different hardness.

The former is a use method utilizing the lubrication characteristic of the solid lubricating coating film originally intended by the present embodiment. The latter is a method for further improving the lubrication characteristic.

It can be expected that the lubrication characteristic is further improved by making the hardness of one of the films harder or softer than that of the film of the present embodiment and making the films face each other rather than making films having a good lubrication characteristic face each other to achieve lubrication. In a situation (phase 1) where a spike-shaped torque rises at the time of make-up/break-out in a rattling situation until the threads are engaged with each other as indicated using FIGS. 2A and 2B, it can be expected that the soft coating film deforms itself to lower a surface pressure. In addition, with the hard coating film of the present embodiment mainly containing BN and an epoxy resin coating film, high lubrication can be expected in the entire region of make-up/break-out of the connection.

<Method for Manufacturing Solid Lubricating Coating Film>

A film can be formed by applying an agent at once to a thickness desired to be formed and forming a film by firing or the like.

Preferably, instead of performing main firing many times by a method for forming a film a plurality of times, it is preferable to perform a temporary heat treatment (temporary drying) once or more at a temperature lower than a main firing temperature, and then perform the main firing to form a film. In this case, the solid lubricating coating film thickness by one application is set to 50 μm or less, the temporary drying step is interposed between applications, and a coating film is formed on the formed coating film and temporarily dried. These steps are performed in two or more steps including the first film formation, and in the final film formation, the temporary drying is not performed and a main drying step is performed. Examples of the main drying step include firing, infrared irradiation, ultraviolet irradiation, a drying means such as hot air, leaving the film in the atmosphere, and natural drying. The final total film thickness of a coating film to be formed is preferably adjusted to 10 to 150 μm. The temporary drying refers to, for example, drying in which only a part (for example, 30% to 70%) of a solvent is blown off.

In the present embodiment, a film is formed with an agent based on a solution obtained by dissolving a solid lubricant mainly containing BN and a binder resin mainly containing an epoxy resin in a solvent. The agent is preferably a highly viscous agent containing a large amount of film components with respect to a solvent. In this case, when a film is formed at one time, due to an influence of surface tension along a connection for oil country tubular goods structure, a liquid tends to be pulled to have a small thickness at a corner portion on a thread, and the liquid tends to accumulate at a corner portion on a root. Therefore, it is preferable to perform firing a plurality of times.

However, when the main firing is performed a plurality of times, adhesion between the films may be weak, and the films tend to be easily peeled off from each other. Therefore, it is preferable to perform temporary firing in a state where a part of the components of the solvent is blown off, repeat application and temporary firing again, form a film while performing temporary firing until a required film thickness is obtained, and then perform main firing. This is because this effectively functions for uniformity of film quality and uniformity of film thickness. In addition, a pinhole penetrating the entire film is less likely to be formed in the film formation by applying the agent a plurality of times from a viewpoint of corrosion resistance. This is also effective.

In addition, it is preferable to perform the main firing by two-stage heat treatment in order to strengthen the cross-linked structure of the epoxy resin. It can be expected that a complete crosslinked structure can be formed by performing a primary curing treatment at a temperature of Tg temperature or lower to gelate the agent, and then performing secondary curing at a temperature of the Tg temperature or higher.

Note that detailed description of the solid lubricant containing BN as a main component, the binder resin containing an epoxy resin as a main component, and other additives relating to the present embodiment, and the method for simulating actual well conditions as an evaluation method will be clarified as well as suitable ranges thereof. The present embodiment can be utilized not only for a solid lubricating coating film formed on a threaded joint for oil country tubular goods but also for an agent for forming the coating film and lubrication of something other than the connection for oil country tubular goods. Hereinafter, description will be made focusing on a box connection (female thread side) and a pin connection (male thread side). However, it is assumed that a Threaded & Coupled (T & C) type joint and an integral type joint of oil country tubular goods are included.

<Test Method for Simulating Actual Well Test Conditions (New Laboratory Test)>

In the present embodiment, as described with reference to FIGS. 2A to 4B, the phenomenon caused by lubrication of the connection for oil country tubular goods is considered in two stages, that is, before the threads are engaged with each other (phase 1) and after the threads are sufficiently engaged with each other (phase 2). Then, in consideration of make-up/break-out (lubrication) in the first stage (phase 1), thread lubrication is comprehensively evaluated including lubrication in the second stage (phase 2).

If this evaluation is not performed, although it is OK in evaluation of a laboratory test, troubles may frequently occur in an actual well. In an actual well, a large load and an unbalanced load are applied before the threads are engaged with each other. Therefore, the solid lubricating coating film is damaged or peeled off. In a severe case, the film may be thoroughly peeled off. Based on this, upper and lower limits of a suitable range of a parameter of the present embodiment are selected.

As described above, in the case of the solid lubricating coating film, damage to the coating film cannot be avoided by make-up or the like until the threads are engaged with each other. Then, a secondary product is formed based on the peeled film. If a thread gap is clogged with this secondary product, seizure occurs. Therefore, if lubrication evaluation is not performed under a condition conforming to an actual well, there is a concern that even a solid lubricating coating film that is actually at an unacceptable level is erroneously judged to be acceptable. When the evaluation is based on such lax evaluation, limitation with upper and lower limits of a parameter related to the solid lubricating coating film and selection of a suitable range are meaningless.

That is, it is impossible to accurately specify the solid lubricating coating film unless consideration is given to whether or not a secondary product formed by damage or peeling of the solid lubricating coating film, that is, a "secondary product" to be reconstructed affects lubrication. In the present embodiment, evaluation is performed by a new laboratory test in consideration of such findings.

Note that if evaluation with a horizontal power tong using a short pin or evaluation with a vertical power tong using a short pin (evaluation by a conventional laboratory test) is relied on, there is no meaning in evaluation of the solid lubricating coating film. In past PTLs, it is sometimes described that the number of times of make-up/break-out can be up to 15 to 20 even for a large diameter size of 9⅝" or 13⅜" in a lubrication test based on a solid lubricating coating film. That is, even in the solid lubricating coating film, the result is not inferior to that of a greasy compound, but the number of times is substantially impossible in the solid lubricating coating film. In the solid lubricating coating film, the solid lubricating coating film, which mainly causes lubrication, is inevitably scraped. Meanwhile, in the case of the greasy compound, a surface is cleaned and the compound is applied again every time make-up/break-out are performed, and therefore a heavy metal such as Pb or Zn, which mainly causes lubrication, is supplied every time. Therefore, in a case of a large diameter with a solid lubricating coating film in make-up/break-out in an actual well, a level of 15 to 20 times is almost impossible. In addition, regarding lubrication of the solid lubricating coating film, the expression that the number of times of make-up/break-out can be about 15 to 20 is considered to be a case where thread lubrication is evaluated only in phase 2 after the threads are sufficiently engaged with each other without going through phase 1 in which the threads are not engaged with each other. That is, it is considered that the evaluation is based on a horizontal or vertical power tong using a short pin, which is often seen in a conventional laboratory test.

Figure 5:
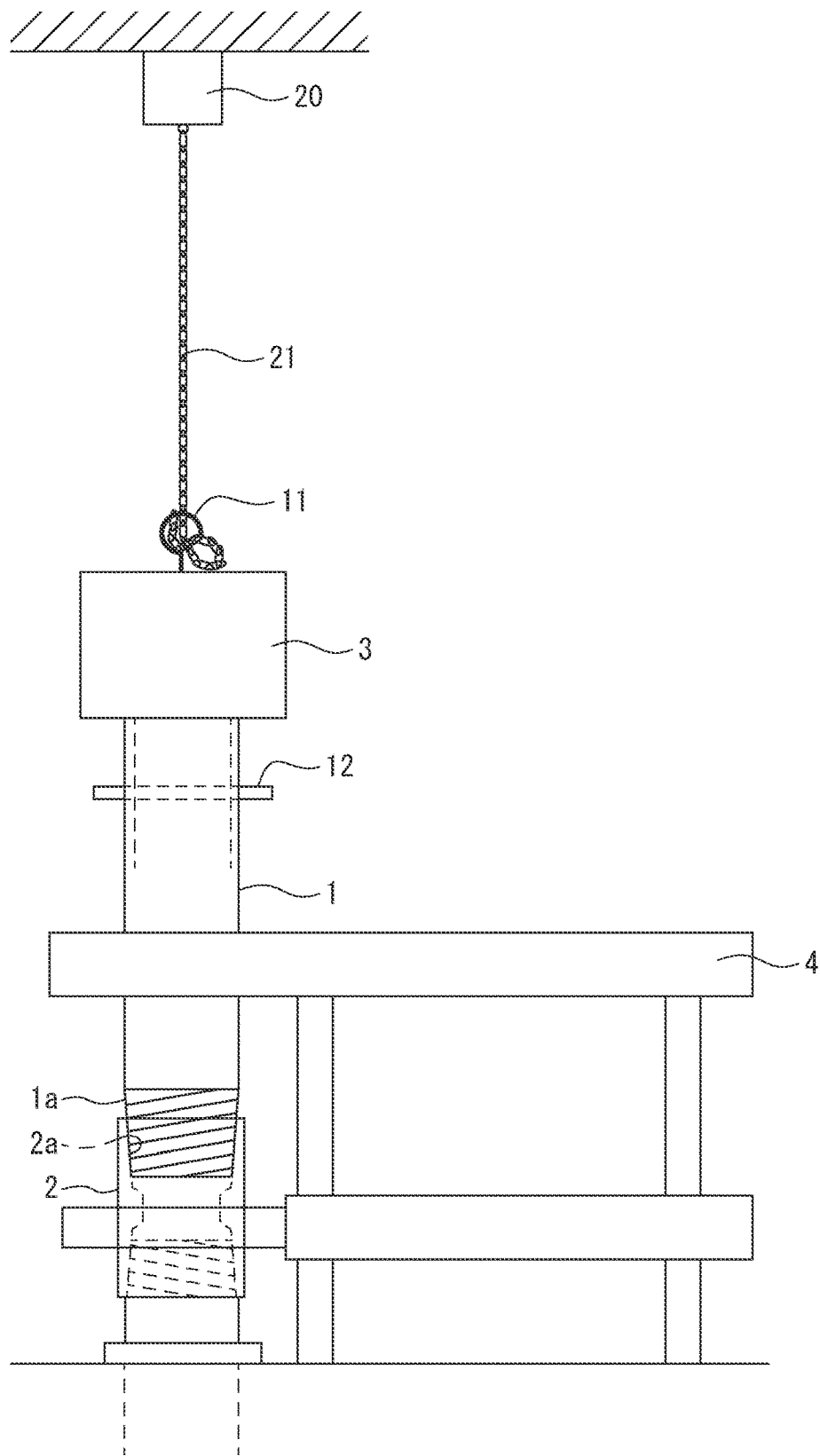
FIG. 5 is a diagram for explaining a new laboratory test (heavy bob tong test)

In the present embodiment, a test is performed with a device configuration illustrated in FIG. 5 based on conditions of the above new laboratory test.

The new laboratory test is based on evaluation under conditions that can achieve a large load condition at the time of make-up and an unbalanced load condition at the time of make-up/break-out. In the new laboratory test, for example, in a step in which a large load corresponding to an actual size pin is applied and connection is made up, rattling until the threads are engaged with each other is considered. In addition, in a step of break-out the connection, a fact that the threads are disengaged from each other and rattling occurs is considered.

In the new laboratory test, a vertical power tong 4 is used. A short pin 1 is adopted as a test pin. However, it is possible to apply a load to an upper portion of the pin 1 by a heavy bob 3 and to remove the load.

The short pin 1 and the box connection 2 are made up by a pin thread portion 1a and a box thread portion 2a.

At this time, in order to simulate a situation where threads are not engaged with each other, an initial temporary make-up position is set such that a half of the total number of the pin threads 1a is exposed from the box connection 2 (see FIG. 2B). This is one of causes of rattling. Make-up is started from that state.

At the time of make-up, the heavy bob 3 is attached to an upper end of the pin 1, which is an end opposite to the make-up connection of the box connection 2.

The weight of the heavy bob 3 is calculated based on an actual size pin having an outer diameter and a wall thickness of the pin so as to be a load corresponding to one to three actual size pins. In a case of a pin having a size of 9⅝" 53.5 #, the weight of the heavy bob 3 is about one ton (2, 200 Lb) load for one pin, or about three tons (6, 600 Lb) when the weight corresponds to three connected pins.

Figure 6:
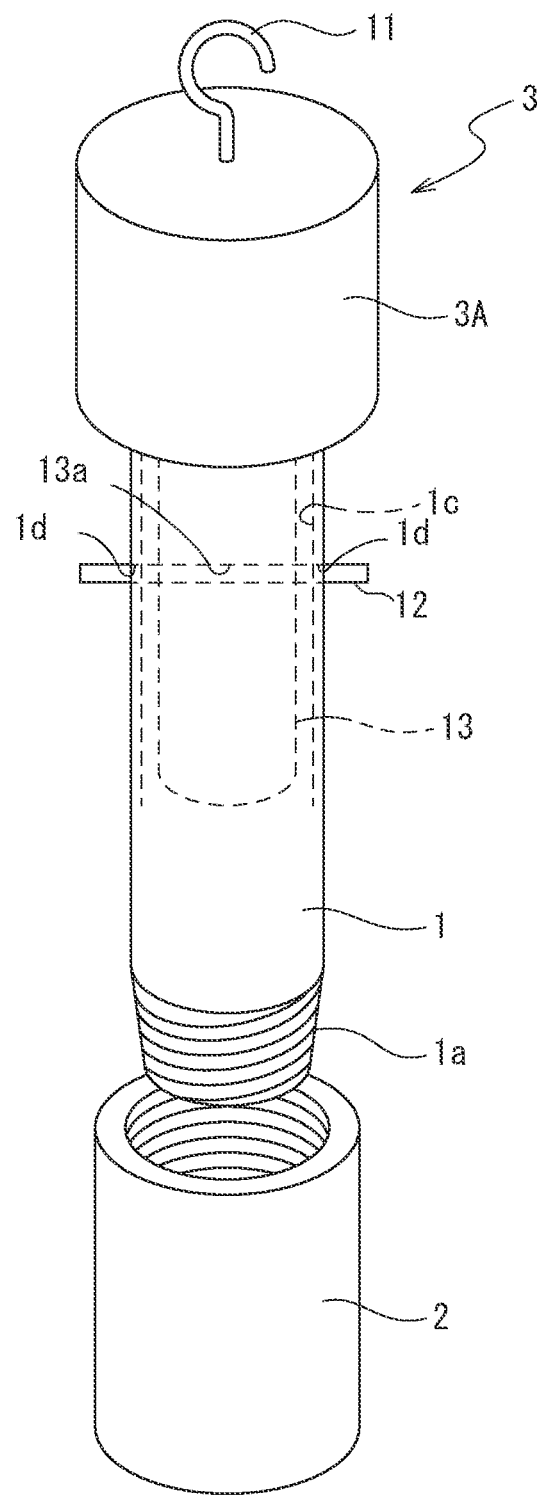
FIG. 6 is a diagram illustrating a set example of a heavy bob in the new laboratory test (heavy bob tong test)

As illustrated in FIG. 6, the heavy bob 3 illustrated in FIG. 5 includes a heavy bob body 3A and an insertion rod 13. The insertion rod 13 is joined to a lower surface of the heavy bob body 3A by welding, and is disposed at an axisymmetric position of the heavy bob 3. By inserting the insertion rod 13 into the pin 1 in a loosely inserted state, the heavy bob is attached to the pin. Reference numeral 1c denotes an inner diameter surface of the pin 1.

In the insertion rod 13 and the pin 1, holes 1d and 13a penetrating the pin 1 and the insertion rod 13 when the heavy bob 3 is attached as described above are formed in advance. Then, as illustrated in FIG. 6, by inserting a penetrating rod 12 into the holes 1d and 13a, the heavy bob 3 and the pin 1 are integrated.

A Swivel type hook 11 is attached to an axial center position of an upper portion of the heavy bob 3 by welding, and the heavy bob 3 is suspended from a ceiling suspension device 20 via a suspension chain 21. As a result, the magnitude of the load of the heavy bob on the pin can be adjusted by adjusting the lifting level of the heavy bob by the suspension device 20.

At the time of make-up, the suspension chain 21 is broken out, a heavy bob load is applied to the box connection, and connection is made up at 5 to 20 rpm until a torque rises (phase 1). This is a simulation of rattling. When the torque rises, the rotation speed is decreased to 0.5 to 2 rpm, and make-up is performed up to a make-up position (phase 2).

Meanwhile, when loosening (break-out), the heavy bob 3 is lifted by the suspension device 20, and break-out is performed in a state where the load of the heavy bob 3 is not applied. As for the rotation speed, when the torque rises, break-out is started at a rotation speed of 0.5 to 2 rpm, and when the torque reaches about 1/10 of a make-up torque value, break-out is performed at a high rotation speed of 5 to 20 rpm.

Here, a condition closer to an actual well environment is obtained when a load by the heavy bob 3 is not applied at the time of break-out. This is a finding based on an experimental fact that evaluation of a lubrication characteristic is better in a case of applying the load of the heavy bob 3 than in a case of not applying the load. That is, as a result of actually observing the experiment, the inventor has found that when break-out is performed in a state where the heavy bob is applied, the heavy bob acts as a balancer, and the pin is loosened straight from the make-up completion position without rattling. Meanwhile, the inventor has found that, when the heavy bob is reduced, that is, when a test is performed by lifting a load in order to reduce the heavy bob load to zero, the test can be performed under a condition where rattling of the pin is severe and the solid lubricating coating film is likely to be damaged in a situation where the load is reduced and the joint is loosened, including a case where the load is not completely zero.

In the new laboratory test under the above conditions, it is possible to simulate a situation in which a secondary product derived from a solid lubricating coating film-derived component that is released into a thread gap due to inevitable peeling or the like does not move following make-up/break-out and clogs a certain place to cause seizure, or a situation in which the coating film itself is thoroughly peeled off. As a result, the upper and lower limits of a parameter related to the solid lubricating coating film can be specified as those conforming to actual well conditions. After completion of break-out, evaluation was performed by separating the pin connection and the box connection from each other, and removing fragments and the like derived from the solid lubricating coating film on surfaces of the threads by air blowing, then checking the surfaces, and continuing make-up again.

The present embodiment specifies components and the like in order to achieve a lubrication characteristic that can withstand an environment that can occur in an actual well. In addition, the upper and lower limits are specified by performing confirmation under conditions conforming to make-up/break-out conditions in an actual well.

The new laboratory test under the above conditions is hereinafter also referred to as a heavy bob tong test.

In the present embodiment, as described with reference to FIGS. 2A to 4B, it is important to divide a phenomenon that occurs in lubrication of a connection for oil country tubular goods into two phases for consideration, and to evaluate thread lubrication in consideration of make-up/break-out (lubrication) at an initial stage. If this evaluation is not performed, although it is OK in evaluation of a laboratory test, troubles may frequently occur in an actual well. In an actual well, there are make-up/break-out mainly focusing on lubrication in a state where there is rattling before threads are engaged with each other, and make-up/break-out mainly focusing on lubrication after the threads are sufficiently engaged with each other. In an actual well, the weight of one actual size pin, or the weight of three connected actual size pins depending on a situation, is applied to a female thread on a receiving side. A pin is not ideally vertically straight made up. In reality, a pin connection is bent in an elastic region, tends to be set slightly bent, and is necessarily made up eccentrically by the rattling at an initial stage of make-up and a final stage of break-out. In the above horizontal and vertical power tongs using a short pin, the solid lubricating coating film needs to withstand a situation in which a torque is not stable until the threads are engaged with each other, and sometimes a spike-shaped torque rises, as illustrated in (x) of FIG. 4A.

(Others)

The present disclosure can also have the following configurations.

(1) An agent for forming a solid lubricating coating film on a thread portion of oil country tubular goods, in which a solid lubricant is dispersed in a binder resin, the binder resin contains a prepolymer and a curing agent, the prepolymer is formed of one or more epoxy resins, 70 parts by weight or more of the prepolymer is contained with respect to 100 parts by weight of the binder resin, the epoxy resin constituting the prepolymer has an epoxy equivalent of 100 or more and 500 or less, the solid lubricant contains boron nitride (BN) in an amount of 80% by weight or more, BN has an average particle size of 10 μm or less, and a total weight of the solid lubricant is 0.1 times or more and two times or less a total weight of the binder resin.

(2) The agent includes a solvent component in an amount of 30 parts by weight or more and 80 parts by weight or less with respect to 100 parts by weight of a sum of a total weight of the solid lubricant and a total weight of the binder resin excluding the curing agent.

(3) The agent includes a curing accelerator in an amount of 0 parts by weight or more and 10 parts by weight or less with respect to 100 parts by weight of a total weight of the agent.

(4) The epoxy resin constituting the prepolymer has more than two epoxy groups (polyfunctional epoxy resin).

(5) The epoxy resin constituting the prepolymer has six or less epoxy groups.

(6) The epoxy resin constituting the prepolymer has four or less epoxy groups.

(7) The curing agent is a curing agent to cure an epoxy resin, and is formed of an amine-based curing agent, an acid anhydride-based curing agent, a phenol-based curing agent, or a latent curing agent.

(8) The epoxy resin constituting the prepolymer has a glass transition temperature Tg of 100° C. or higher.

(9) The agent has a viscosity of 20 mPa·sec or more and 2,000 mPa·sec or less.

(10) Oil country tubular goods having a lubricating coating film including a solid lubricating coating film on a thread portion, in which the solid lubricating coating film is formed by dispersing a solid lubricant in a binder resin, the binder resin contains an epoxy resin cured with a curing agent, 70 parts by weight or more of the epoxy resin is contained with respect to 100 parts by weight of the binder resin, the epoxy resin has an epoxy equivalent of 100 or more and 500 or less, the solid lubricant contains boron nitride (BN) in an amount of 80% by weight or more, BN has an average particle size of 10 μm or less, and a total weight of the solid lubricant is 0.1 times or more and two times or less a total weight of the binder resin.

(11) The epoxy resin has more than two epoxy groups (polyfunctional epoxy resin).

(12) The epoxy resin has six or less epoxy groups.

(13) The epoxy resin has four or less epoxy groups.

(14) The curing agent is a curing agent to cure an epoxy resin, and is formed of an amine-based curing agent, an acid anhydride-based curing agent, a phenol-based curing agent, or a latent curing agent.

(15) The epoxy resin has a glass transition temperature Tg of 100° C. or higher.

(16) The solid lubricating coating film has a pencil hardness of 3H or more.

(17) The solid lubricating coating film has a thickness of 10 μm or more and 150 μm or less.

(18) The lubricating coating film is formed on a tightening surface of a thread portion of at least one of the box and the pin.

(19) The lubricating coating film has a base layer between a tightening surface of the thread portion and the solid lubricating coating film, and the base layer is formed of a chemical conversion-treated layer or an electroplated layer.

(20) A threaded joint for oil country tubular goods connecting a box having a female thread and a pin having a male thread, in which oil country tubular goods of at least one of the box and the pin is constituted by the oil country tubular goods having the lubricating coating film of the present disclosure.

EXAMPLES

Next, Examples based on the present embodiment will be described.

<Acceptance Criteria>

First, an acceptance criteria of a lubrication behavior based on the number of times of make-up/break-out will be described.

In the judgement criterion, as for a casing size, those that could be made up and broken out three or more times were judged as acceptable, and those that could be made up and broken out five times were judged as better. As for a tubing size, those that could be made up and broken out five or more times were judged as acceptable, and those that could be made up and broken out ten times or more were judged as better. The casing size is specified in accordance with the definition of ISO 13679. Meanwhile, as for the tubing, those that could be made up and broken out five or more times were regarded as acceptable, which is a lower criterion than the definition of ISO 13679.

It is clear that the M/B number of times tends to be worse than lubrication using a conventional greasy compound because of the solid lubricating coating film. This is also being recognized in the oil and gas industry.

As described above, the definition of ISO 13679 can be a simple goal if a make-up/break-out test is performed simply using a short pin from a state where threads are engaged with each other. However, in the present embodiment, evaluation was performed by a "heavy bob tong test (new laboratory test)" in order to simulate a condition in which a large load and an unbalanced load are applied and rattling in which threads are not engaged with each other occurs, which is close to a condition that can actually occur in a well.

In the following description, 9⅝"53.5 #, 9⅝"43.5 #, and 7"29 # are used. In many cases, since a size to which casing is applied is used, those that could be made up and broken out three or more times are judged as acceptable, and those that could be made up and broken out five times are judged as better, as described above.

As a condition in which a load of three connected pins is applied, in a study case of 9⅝"53.5 #, a test was performed using a heavy bob of a three ton load. In 9⅝"43.5 # and 7"29 #, study was performed using heavy bobs of 2.5 tons and one ton, respectively.

As for an initial make-up position, make-up was performed from a state where connection was made up only up to a position where a half of the total number of pin threads was exposed from the box connection, that is, the threads were not engaged with each other. That is, make-up was performed by the device illustrated in FIGS. 5 and 6. The test was performed in a state where a load was applied at the time of make-up and a load was not applied at the time of break-out.

If the test is performed under a load loading condition by a heavy bob at the time of break-out, when a pin in which a short pin and a heavy bob are integrated is used, the short pin integrated with the heavy bob rises straight from a make-up position unlike an actual size pin of an actual well. Since the heavy bob acts as a balancer, rattling does not occur. Since the actual size pin slightly bends due to its long length, as threads gradually move around and are not engaged with each other, rattling occurs, and there is a high tendency to destroy the solid lubricating coating film. Therefore, in lubrication evaluation using a heavy bob tong, the test was performed without applying a load at the time of break-out, and rattling that occurs in conjunction with a situation where the threads are not engaged with each other was simulated. In addition, not applying a load does not necessarily mean that the load is zero. The test was performed by lifting the heavy bob with an overhead crane or the like such that a load of the heavy bob was not applied. Note that the test for confirming the number of times of make-up/break-out using the heavy bob tong was performed two or more times. Whether or not the number of times of make-up/break-out in each test achieved the acceptance criteria were compared and evaluated based on how many times the acceptance criteria was achieved with respect to the number of tests to determine whether or not the parameter was acceptable.

Example 1

Next, Example 1 based on the present embodiment will be described with reference to Tables.

In this Example, mainly, a lubricating coating film including a solid lubricating coating film is formed on a tightening surface 10 of a threaded joint for oil country tubular goods, and whether or not the lubricating coating film including the solid lubricating coating film is acceptable is evaluated. In this Example, a make-up/break-out test was performed under the conditions presented in Tables 1 to 4, and whether or not the lubricating coating film was acceptable was judged.

TABLE 1

| | Steel type | OD (inch) | WT (LPF) | Screw type | Side where the coating film is formed | Base film and base treatment | Viscosity of epoxy resin chemical agent (mPa · sec at room temperature) | % by weight of solid lubricating BN (with respect to total weight of solid lubricant) |
|---|---|---|---|---|---|---|---|---|
| 1 | Q125 | 9⅝" | 53.5# | JFELION™ | CPLG screw | MnPhos | 200 | 100% |
| | | | | | PIN screw | — | — | — |
| 2 | Q125 | 9⅝" | 53.5# | JFELION™ | CPLG screw | MnPhos | 200 | 100% |
| | | | | | PIN screw | Shot blasted | — | — |
| 3 | Q125 | 9⅝" | 53.5# | JFELION™ | CPLG screw | MnPhos | 200 | 100% |
| | | | | | PIN screw | Shot blasted | — | — |
| 4 | Q125 | 9⅝" | 53.5# | JFELION™ | CPLG screw | MnPhos | 200 | 100% |
| | | | | | PIN screw | Shot blasted | — | — |
| 5 | Q125 | 9⅝" | 53.5# | JFELION™ | CPLG screw | MnPhos | 200 | 100% |
| | | | | | PIN screw | Shot blasted | — | — |
| 6 | Q125 | 9⅝" | 53.5# | JFELION™ | CPLG screw | MnPhos | — | — |
| | | | | | PIN screw | Shot blasted | 200 | 100% |
| 7 | C110 | 9⅝" | 53.5# | JFELION™ | CPLG screw | MnPhos | 2200* | 100% |
| | | | | | PIN screw | Shot blasted | — | — |
| 8 | C110 | 9⅝" | 53.5# | JFELION™ | CPLG screw | MnPhos | | 100% |
| | | | | | PIN screw | Shot blasted | — | — |
| 9 | C110 | 9⅝" | 53.5# | JFELION™ | CPLG screw | MnPhos | 180 | 100% |
| | | | | | PIN screw | MnPhos | 180 | 100% |
| 10 | C110 | 9⅝" | 53.5# | JFELION™ | CPLG screw | MnPhos | 180 | 100% |
| | | | | | PIN screw | Shot blasted | — | — |

TABLE 1-continued

| | Average particle size of BN (μm) | Other solid lubricant | Chemical agent as epoxy resin | Number of epoxy groups | Epoxy equivalent |
|---|---|---|---|---|---|
| 1 | 20* | None | Cresol/novolac type epoxy resin | 6 | 200 |
| | — | — | — | — | — |
| 2 | 20* | None | Cresol/novolac type epoxy resin | 6 | 200 |
| | — | Metal soap | Acrylate-based fluorine-based coating material | — | — |
| 3 | 5 | None | Cresol/novolac type epoxy resin | 6 | 200 |
| | — | Metal soap | Acrylate-based fluorine-based coating material | — | — |
| 4 | 5 | None | Cresol/novolac type epoxy resin | 6 | 200 |
| | — | Metal soap | Acrylate-based fluorine-based coating material | — | — |
| 5 | 5 | None | Cresol/novolac type epoxy resin | 6 | 200 |
| | — | Metal soap | Acrylate-based fluorine-based coating material | — | — |
| 6 | — | Metal soap | Acrylate-based fluorine-based coating material | — | — |
| | 5 | None | Cresol/novolac type epoxy resin | 6 | 200 |
| 7 | 5 | None | Trisphenol methane type epoxy resin | 3 | 165 |
| | — | Metal soap | Acrylate-based fluorine-based coating material | — | — |
| 8 | 10 | None | Trisphenol methane type epoxy resin | 3 | 170 |
| | — | Aluminum powder | Aqueous acrylate | — | — |
| 9 | 10 | None | Trisphenol methane type epoxy resin | 3 | 170 |
| | 10 | None | Trisphenol methane type epoxy resin | 3 | 170 |
| 10 | 10 | None | Trisphenol methane type epoxy resin | 3 | 170 |
| | — | — | — | — | — |

TABLE 2

| | Name of curing agent | Functional group equivalent of curing agent | Other additive | Tg of epoxy resin film (° C.) | pbr with respect to 100 parts by weight of total weight of curing aid epoxy resin (pbr) | Curing aid | Solvent | Mixing ratio of solvent (parts by weight) with respect to 100 parts by weight of solid lubricant + prepolymer |
|---|---|---|---|---|---|---|---|---|
| 1 | Phenol/novelac-based curing agent | 195 | None | 200 | 2 | TPP Triphenyl-phosphine | Toluene/methyl ethyl ketone (MEK)/dimethyl cellosolve (DME) | 70 |
| | — | — | — | — | — | — | HFE | — |
| 2 | Phenol/novolac-based curing agent | 195 | None | 200 | 2 | TPP Triphenyl-phosphine | Toluene/MEK/DME | 50 |
| | — | — | — | — | — | — | HFE | — |
| 3 | Phenol/novolac-based curing agent | 195 | None | 200 | 2 | TPP Triphenyl-phosphine | Toluene/MEK/DME | 30 |
| | — | — | — | — | — | — | HFE | — |
| 4 | Phenol/novalac-based curing agent | 195 | None | 200 | 2 | TPP Triphenyl-phosphine | Toluene/MEK/DME | 30 |
| | — | — | — | — | — | — | HFE | — |

TABLE 2-continued

| | | | | | | | | |
|---|---|---|---|---|---|---|---|---|
| 5 | Phenol/novolac-based curing agent | 195 | None | 200 | 2 | TPP Triphenyl-phosphine | Toluene/MEK/DME | 30 |
| | — | — | — | — | — | — | HFE | — |
| 6 | — | — | — | — | — | — | HFE | — |
| | Phenol/novolac-based curing agent | 195 | None | 200 | 2 | TPP Triphenyl-phosphine | Toluene/MEK/DME | 30 |
| 7 | 40% Modified alicyclic polyamine and 60% polyamidoamine | 95 | — | 110 | — | — | Example of two-liquid type Epoxy resin side: none Curing agent side: MEK | — |
| | — | — | — | — | — | — | HFE | — |
| 8 | Diethylenetriamine-based curing agent | 125 | None | 150 | — | — | Propyleneglycol monomethyl ether | 80 |
| | — | — | — | — | — | — | Water | — |
| 9 | Diethylenetriamine-based curing agent | 125 | None | 150 | — | — | Propyleneglycol monomethyl ether | 60 |
| | Diethylenetriamine-based curing agent | 125 | None | 150 | — | — | Propyleneglycol monomethyl ether | 60 |
| 10 | Diethylenetriamine-based curing agent | 125 | None | 150 | — | — | Propyleneglycol monomethyl ether | 60 |
| | — | — | — | — | — | — | — | — |

| | Firing temperature Firing pattern | Film thickness of solid lubricating film (μm) | Pencil hardness of solid lubricating film | Make/break | number of times | Remarks |
|---|---|---|---|---|---|---|
| 1 | 160° C. × 2 hr. + 180° C. × 4 hr. | 45 | 3H | Horizontal tong | ≥5 times ≥5 times | Reference comparative case |
| | — | — | — | | | |
| 2 | 160° C. × 2 hr. + 180° C. × 4 hr. | 45 | 3H | Heavy bob tong 3ton (Vertical tong to which weight corresponding to vertical three connected pins is applied) | 2 times 1 time 3 times | Comparative example |
| | Left in the atmosphere and dried | 10~15 | ≤6B | | | |
| 3 | 160° C. × 2 hr. + 180° C. × 4 hr. | 45 | 3H | Heavy bob tong 3ton (Vertical tong to which weight corresponding to vertical three connected pins is applied) | ≥5 times ≥5 times ≥5 times | Inventive example |
| | Left in the atmosphere and dried | 10~15 | ≤6B | | | |
| 4 | 160° C. × 2 hr. + 180° C. × 4hr. | 45 | 3H | Simulated well test using actual size PIN (Three pins of Range-3size are connected) | ≥5 times ≥5 times ≥5 times | Inventive example |
| | Left in the atmosphere and dried | 10~15 | ≤6B | | | |
| 5 | 160° C. × 2 hr. + 180° C. × 4 hr. | 8* | 3H | Heavy bob tong 3ton (Vertical tong to which weight corresponding to vertical three connected pins is applied) | 3 times 1 time 1 time | Comparative example |
| | Left in the atmosphere and dried | 10~15 | ≤6B | | | |
| 6 | Left in the atmosphere and dried | 10~15 | ≤6B | Simple vertical tong | 3 times 4 times 4 times | Inventive example |
| | 160° C. × 2 hr. + 180° C. × 4 hr. | 10~15 | 3H | | | |
| 7 | Left in the atmosphere and dried | 20 | 3B* | Heavy bob tong 3ton (Vertical tong to which weight corresponding to vertical three connected pins is applied) | Quickly solidified, in form of water syrup, and appolied with difficulty 2 times 1 time 3 times | Comparative example |
| | Left in the atmosphere and dried | 30 | 6B | | | |

TABLE 2-continued

|   | | | | | | | |
|---|---|---|---|---|---|---|---|
| 8 | Left in the atmosphere for five days | 55 | 3H | Heavy bob tong 3ton (Vertical tong to which weight corresponding to vertical three connected pins is applied) | 8 times ≥10 times 10 times | Inventive example |
|   | Blower drying | 10~15 | 4B | | | |
| 9 | Left in the atmosphere for five days | 55 | 3H | Heavy bob tong 3ton (Vertical tong to which weight corresponding to vertical three connected pins is applied) | 4 times 3 times 3 times | Inventive example |
|   | Left in the atmosphere for five days | 55 | 3H | | | |
| 10 | Left in the atmosphere for five days | 55 | 3H | Heavy bob tong 3ton (Vertical tong to which weight corresponding to vertical three connected pins is applied) | 4 times 3 times 3 times | Inventive example |
|   | — | — | — | | | |

TABLE 3

|    | Steel type | OD (inch) | WT (LPF) | Screw type | Side where the coating film is formed | Base film and base treatment | Viscosity of epoxy resin chemical agent (mPa·sec at room temperature) |
|----|------------|-----------|----------|------------|----------------------------------------|------------------------------|---------------------------------------------|
| 11 | C110 | 9⅝" | 53.5# | JFELION™ | CPLG screw | MnPhos | 800 |
|    |      |     |       |          | PIN screw | Shot blasted | — |
| 12 | C110 | 9⅝" | 53.5# | JFELION™ | CPLG screw | MnPhos | 800 |
|    |      |     |       |          | PIN screw | Shot blasted | — |
| 13 | C110 | 9⅝" | 53.5# | JFELION™ | CPLG screw | MnPhos | 750 |
|    |      |     |       |          | PIN screw | Shot blasted | — |
| 14 | C110 | 7"  | 29#   | JFELION™ | CPLG screw | MnPhos | 250 |
|    |      |     |       |          | PIN screw | Shot blasted | — |
| 15 | Q125 | 9⅝" | 43.5# | JFELION™ | CPLG screw | MnPhos | 3500* (Viscosity of epoxy resin as prepolymer) |
|    |      |     |       |          | PIN screw | Shot blasted | — |
| 16 | Q125 | 9⅝" | 43.5# | JFELION™ | CPLG screw | MnPhos | 25* |
|    |      |     |       |          | PIN screw | Shot blasted | — |

|    | % by weight of solid lubricating BN (with respect to total weight of solid lubricant) | Average particle size of BN (μm) | Other solid lubricant | Chemical agent as epoxy resin | Number of apoxy groups | Epoxy equivalent |
|----|----|----|----|----|----|----|
| 11 | 100% | 5 | None | Tetrakispenol ethane type epoxy resin | 4 | 165 |
| 12 | 100% | 5 | None | Tetrakispenol ethane type epoxy resin | 4 | 165 |
|    | — | — | — | — | — | — |

TABLE 3-continued

| | | | | | | |
|---|---|---|---|---|---|---|
| 13 | —* | —* | — | Tetrakisphenol ethane type epoxy resin | 4 | 165 |
| | — | — | Metal soap | Acrylate-based fluorine-based coating material | — | — |
| 14 | 85% | 3 | 15% PTFE | Glycidyl ester type epoxy resin | 3 | 190 |
| | — | — | Metal soap | Acrylate-based fluorine-based coating material | — | — |
| 15 | 100% | 5 | None | Polyglycerol polyglycidyl ether-based resin and polyglycerol polyglycidyl ether-based resin are mixed at 1:1 | ≥6 | 510* (Epoxy resin) |
| 16 | — | — | — | — | — | — |
| | 100% | 5 | None | | 2 | 135 |
| | — | — | Metal soap | Acrylate-based fluorine-based coating material | — | — |

TABLE 4

| | Name of curing agent | Functional group equivalent of curing agent | Other additive | Tg of epoxy resin film (° C.) | pbr with respect to 100 parts by weight of total weight of curing aid epoxy resin (pbr) | Curing aid | Solvent | Mixing ratio of solvent (parts by weight) with respect to 100 parts by weight of solid lubricant + prepolymer |
|---|---|---|---|---|---|---|---|---|
| 11 | Phenol/novolac-based curing agent | 200 | None | 206 | 1 | TPP Triphenyl-phosphine | Ethyleneglycol t-butyl ether | 40 |
| 12 | Phenol/novolac-based curing agent | 200 | None | 206 | 1 | TPP Triphenyl-phosphine | Ethyleneglycol t-butyl ether | 75 |
| 13 | Phenol/novolac-based curing agent | 200 | None | 206 | 1 | TPP Triphenyl-phosphine | Ethyleneglycol t-butyl ether | 75 |
| | — | — | — | — | — | — | HFC | — |
| 14 | — | — | — | 185 | 5 | 1,2,4-Triazole | Dioxyalkylene ether | 35 |
| | — | — | — | — | — | — | HFE | — |
| 15 | Phthalic anhydride | 297 | None | 160 | 2 | DMP-30: 2,4,6-tris (dimethyl-aminomethyl) phenol | Example of two-liquid type solvent Solvent of epoxy resin: diethyl acetamide Solvent of curing agent: none Curing aid: none | 40 |
| 16 | Dicyan-diamide | 10 with respect to 100 of epoxy resin chemical agent | None | 95* | 4 | Imidazole | (Not used) Curing aid is mixed when epoxy resin is cured | 60 |
| | — | — | — | — | — | — | HFE | — |

TABLE 4-continued

| | Firing temperature Firing pattern | Film thickness of solid lubricating film (μm) | Pencil hardness of solid lubricating film | Make/break number of times | | Remarks |
|---|---|---|---|---|---|---|
| 11 | 160° C. × 2 hr. + 180° C. × 6 hr | 30 | 6H | Heavy bob tong 3ton (Vertical tong to which weight corresponding to vertical three connected pins is applied) | 7 times 8 times 6 times | Inventive example |
| | | — | — | — | | |
| 12 | 160° C. × 2 hr. + 180° C. × 6 hr | 30 | 6H | Heavy bob tong 3ton (Vertical tong to which) weight corresponding to vertical three connected pins is applied) | 9 times 6 times 7 times | Inventive example |
| | | — | — | — | | |
| 13 | 160° C. × 2 hr. + 180° C. × 6 hr. | 4 | 6H | Heavy bob tong 3ton (Vertical tong to which weight corresponding to vertical three connected pins is applied) | 2 times 1 time 2 times | Comparative example |
| | Left in the atmosphere and dried | 10~15 | ≤6B | | | |
| 14 | 160° C. × 2 hr. + 180° C. × 6 hr. | 50 | 4H | Heavy bob tong 1ton (Vertical tong to which weight corresponding to vertical three or more connected pins is applied) | 3 times 4 times 4 times | Inventive example |
| | Left in the atmosphere and dried | 10~15 | ≤6B | | | |
| 15 | 165° C. × 1 hr. + 180° C. × 2 hr. | In form of posts, applied with difficulty Aimed at 40 μm | 4H | Heavy bob tong 2.5ton (Vertical tong to which weight corresponding to vertical three connected pins is applied) | Chemical agent was in form of paste and applied with difficulty but two examples to which chemical agent could be applied were tasted 3 times 3 times | Inventive example |
| | | — | — | | | |
| 16 | 120° C. 20 min + 150° C. 10 min | Smoothly applied with difficulty Dripping occurs Aimed at 50 μm | 3H | Heavy bob tong 2.5ton (Vertical tong to which weight corresponding to vertical three connected pins is applied) | Chemical agent was too smooth due to its viscosity like that of edible oil dried quickly smoothly applied with difficulty and could not be applied to be thick 2 times 1 time 3 times | Comparative example |
| | Left in the atmosphere and dried | 10~15 | ≤6B | | | |

In Tables, Nos. 1 to 4 are results of a test performed using a steel grade: carbon steel high strength material Q 125, a connection size: 9⅝"53.5 #, and a connection JFELION™.

In Nos. 1 to 4, a solid lubricating coating film was formed on a coupling side connection by forming an epoxy resin mainly containing BN. In addition, Nos. 1 to 4 are examples in which a pin side was shot-blasted and left as it was, or a soft lubricating and rust preventive paint was formed on the pin side.

As the epoxy resin, a cresol/novolac type epoxy resin having six epoxy groups and an epoxy equivalent of 200 was used. As the curing agent, a phenol/novolac-based curing agent having a functional group equivalent of the curing agent, that is, an active hydrogen equivalent of 195 was used. As the curing aid, triphenylphosphine (TPP) was used, and 2 parts by weight (2 pbr) of the curing aid was mixed with respect to 100 parts by weight of a total weight of the epoxy resin and the curing agent to cause curing to proceed. The heat treatment was performed at 160° C. for two hours+at 180° C. for four hours. Note that the epoxy resin had a pencil hardness of 3H as a film hardness.

Note that in Tables, the coupling connection is represented by a CPLG connection, and the pin connection is represented by a Pin connection.

No. 1 is an example in which the BN size of the solid lubricant is 20 μm, which exceeds the specified size of 10 μm, and the film thickness is 45 μm. No. 1 is an example in which a make-up/break-out test of a connection for oil country tubular goods was performed with a horizontal tong. Since the weight of the pin is not applied to the coupling and axial adjustment is performed, No. 1 is an ideal condition in which make-up is performed at a symmetrical position. No. 1 is an example in which the make-up/break-out test could be performed without any particular problem. However, even though BN was out of standard, the number of times of make-up/break-out of five or more was achieved because the test evaluation was a lax condition as compared with the make-up/break-out condition in an actual well.

Meanwhile, No. 2 is a case where an acrylate-based fluorine-based coating material was applied to a pin connection side under the same coupling film conditions as in No. 1. No. 2 is a result of the make-up/break-out test under a condition in which a heavy bob of a three ton load was applied with a vertical tong as illustrated in FIG. 5, that is, the condition of the new laboratory test. As described at the beginning of Examples, make-up/break-out were performed by applying a load at the time of make-up and removing the load at the time of break-out (including loosening the load). Note that the three ton load simulates three connected actual length pins.

In No. 2, the number of times of make-up/break-out was less than the required number of times. In an actual well, the weight of a pin is applied to a coupling connection, the pin is not set at a symmetrical position and straight with respect to the coupling center, but is set such that the axis of the pin bends. In addition, since there is "play" before the threads are engaged with each other, a large load and an unbalanced load are applied to the coupling connection. Under such a condition close to an actual well, when the average particle size of BN of the solid lubricant exceeds the upper limit of 10 μm, the number of times of make-up/break-out does not satisfy the standard.

No. 3 is an example in which the average particle size of BN in the solid lubricating coating film on the coupling side was changed as compared with No. 2. Specifically, No. 3 is an example in which the average particle size of BN is 5 μm within the standard range. Other parameters are also adjusted within the scope of the present disclosure. In No. 3, the number of times of make-up/break-out satisfies the standard also in a heavy bob tong test. It has been indicated that sufficient lubrication can be maintained even in an actual well.

No. 4 is a case where the same conditions as those of No. 3 were used except that the make-up test was performed in a simulated well. No. 4 was devised so as not to apply an impact on a box connection side when a pin connection was set with a stabbing guide using three connected actual length pins. In addition, No. 4 was devised so as to prevent the pin connection from swinging more than necessary using a compensator. This is a result of simulating a situation in an actual well. No. 4 exhibits good lubricity and had the same result as the case of No. 3. This result indicates that the heavy bob tong test that implements the new laboratory test method can simulate the situation in the actual well.

No. 5 is a case where the film thickness is 8 μm, which is less than the lower limit value of 10 μm, as compared with Nos. 3 and 4. No. 5 is a case where it was difficult to perform make-up/break-out and it was judged to be NG.

No. 6 is a case where a film under the conditions of Nos. 1 to 5 was formed not on the coupling connection side but on the short pin side with a film thickness of 10 μm. A simply vertical tong was used, and structurally, a heavy bob was not applied to an upper portion of the coupling. It has been found that even when a coating film relationship between the coupling connection and the pin connection is reversed, the sufficient number of times of make-up/break-out is ensured within the standard of the present disclosure.

In Nos. 3 and 6, it is clear that a good lubrication behavior is exhibited in the case where a BN-based epoxy resin coating film is formed on the coupling side and a soft coating material is applied to the pin side, and conversely, in the case where a BN-based epoxy resin coating film is formed on the pin side and a soft coating material is applied to the coupling side, No. 7 is a case where a test was performed using a steel grade: carbon steel sour resistant material C 110, a connection size: 9⅝"53.5 #, and a connection JFELION™. A solid lubricating coating film was formed on a coupling side connection by forming an epoxy resin mainly containing BN. No. 7 is an example in which a pin side was shot-blasted and a soft lubricating and rust preventive paint was formed on the shot-blasted surface. Only this example of the solid lubricating coating film of the coupling side connection is a two-liquid mixed type. As the epoxy resin, a bisphenol A type epoxy resin having four epoxy groups and an epoxy equivalent of 220 was used. A modified alicyclic polyamine and a polyamidoamine, which are curing agents, were dissolved in a solvent at a weight ratio of 4:6. The functional group equivalent of the curing agent as a whole, that is, the active hydrogen equivalent was 95. Therefore, mixing was performed such that reaction was caused while the bisphenol A type epoxy resin had an epoxy equivalent of 185. This is a soft case where the film hardness is 3B, which is lower than the standard lower limit. Furthermore, due to the two-liquid type, as mixing advanced, the mixture tended to solidify quickly, was in a form of water syrup, and targeted a film thickness of 50 μm. However, it was difficult to say that the film was homogeneous. This is a case (Comparative Example) where the number of times of make-up/break-out was not good.

Nos. 8 to 10 are cases where a test was performed using a steel grade: carbon steel sour resistant material C 110, a connection size: 9⅝"53.5 #, and a connection JFELION™. A solid lubricating coating film was formed on a coupling side connection by forming an epoxy resin mainly containing BN. Nos. 8 to 10 are examples in which a pin side was shot-blasted and a soft lubricating and rust preventive paint was formed on the shot-blasted surface. As the epoxy resin, a trisphenol methane type epoxy resin having three epoxy groups and an epoxy equivalent of 185 was used. In Nos. 8 to 10, as the curing agent, a diethylenetriamine-based curing agent having a functional group equivalent, that is, an active hydrogen equivalent of 125 was used, curing was performed without a lubricating aid, and a glass transition temperature Tg was 150° C. Nos. 8 to 10 are examples in which a film thickness was 55 μm and a pencil hardness was 3H. No. 8 is a case where an epoxy resin coating film was formed on a coupling connection side and a soft lubricating and rust preventive paint was applied to a pin side, and the number of times of make-up/break-out was equal to or larger than the specified number of times.

No. 9 is a case where an epoxy resin coating film was formed not only on a coupling connection side but also on a pin connection side, and this case is also a case where the number of times of make-up/break-out was equal to or larger than the specified number of times.

When Nos. 8 and 9 are compared with each other, No. 8 is better in the number of times of make-up/break-out. It is indicated that lubrication is better when a connection on one side has a hard epoxy resin coating film of 3H or more containing BN as specified in the invention and the other connection has a soft film.

No. 10 is a case where a pin side had no film and was only shot-blasted. It is clear that BN as the solid lubricant is contained within a range specified by the present embodiment, and the epoxy resin coating film has an excellent lubrication characteristic.

Nos. 11 to 13 are cases where a test was performed using a steel grade: carbon steel sour resistant material C 110, a connection size: 9⅝"53.5 #, and a connection JFELION™. A solid lubricating coating film was formed on a coupling side connection by forming an epoxy resin by changing the condition of the solid lubricant BN. Nos. 11 to 13 are examples in which a pin side was shot-blasted and a soft lubricating and rust preventive paint was formed on the shot-blasted surface. As the epoxy resin, a tetrakisphenol ethane type epoxy resin having four epoxy groups and an epoxy equivalent of 165 was used. As the curing agent, a phenol/novolac-based curing agent having a functional group equivalent, that is, an active hydrogen equivalent of 206 was used. This is a case where triphenylphosphine (TPP) was used as a curing aid. This is a case where an epoxy resin was formed on a coupling side connection by changing the condition of the solid lubricant BN.

Nos. 11 and 12 are examples in which a pin side was only shot-blasted. No. 13 is a case where an acrylate-based F coating material containing a metal soap was applied. A difference between Nos. 11 and 12 is a film thickness and a solvent mixing ratio, but both Nos. 11 and 12 are cases where lubrication is good.

No. 13 is a case where BN was not added, and is an example in which the number of times of make-up/break-out does not satisfy the acceptance criterion because a solid lubricant was not contained.

No. 14 is a case where a test was performed using a steel grade: carbon steel sour resistant material C 110, a connection size: 7"29 #, and a connection JFELION™. A solid lubricating coating film was formed on a coupling side connection by forming an epoxy resin under a condition in which the solid lubricant BN was contained in an amount of 85% and PTFE as another solid lubricant was contained in an amount of 15%. No. 14 is an example in which a pin side was shot-blasted and a soft lubricating and rust preventive paint was formed on the shot-blasted surface. As the epoxy resin, a glycidyl ester type epoxy resin having three epoxy groups and an epoxy equivalent of 190 was used. This is an example of a self-polymerization type epoxy resin coating film, in which 5 parts by weight of 1, 2, 4-triazole was added with respect to 100 parts by weight of a total of the weight of the solid lubricant and the weight of the epoxy resin as the prepolymer to form a self-polymerization type epoxy catalyst. In No. 14, lubrication can be regarded as acceptable in a coating film formed within a parameter mixed within the standard of the present disclosure.

Nos. 15 and 16 are cases where the viscosity of the agent is out of a suitable range. Nos. 15 and 16 are cases where a test was performed using a steel grade: carbon steel sour resistant material C 110, a connection size: 9⅝"43.5 #, and a connection JFELION™. A BN-containing epoxy resin coating film was formed on a coupling side. In No. 15, a pin side was shot-blasted and left as it was. In No. 16, a pin side was shot-blasted, and an acrylate-based fluorine-based resin was applied to the pin side.

In No. 15, as the epoxy resin, a mixture of a polyglycerol polyglycidyl ether-based resin and a polyglycerol polyglycidyl ether-based resin at a ratio of 1:1 was used. As the curing agent, phthalic anhydride was used. As the curing aid, DMP-30, that is, 2,4,6-tris (dimethylaminomethyl) phenol was added in an amount of 5 parts by weight with respect to 100 parts by weight of a sum of the total weight of the solid lubricant and the total weight of the epoxy resin. This is a case where the viscosity of the epoxy resin is 3500 mPa·sec, which is significantly higher than the upper limit standard. Since the viscosity is too high, there is a disadvantage that it is difficult to apply the epoxy resin well and homogeneously in a paste form. However, the number of times of make-up/break-out was three times for each of two examples in which the epoxy resin could be applied. Therefore, this is an example judged to be an example of the present invention.

No. 16 is a case where cyclohexanedimethanol diglycidyl ether was used as the epoxy resin, dicyandiamide was used as the curing agent, and imidazole was used as the curing aid. This is a case where the viscosity of the epoxy resin is 25 mPa·sec, which is significantly lower than the lower limit standard. In No. 16, the epoxy resin had a viscosity like that of an edible oil, and there was a tendency that even when the epoxy resin was applied, the epoxy resin did not stay there and accumulated at a six o'clock position. Even when an attempt was made to apply the epoxy resin while the pipe was rotated, the epoxy resin was accumulated at a six o'clock position before being fired, and as a result, the film had a thin thickness of 25 um and could not be a homogeneous film. Therefore, it can be determined that lubrication was not good. In addition, this is a case where the Tg of the epoxy resin film is also out of the suitable range. Therefore, the make-up/break-out test was tried three times, but in No. 16, the results were two times, one time, and three times, which cannot be said to be excellent. No. 16 corresponds to Comparative Example.

Example 2

Example 2 is evaluation of corrosion resistance by a salt spraying test.

Among the cases illustrated in Example 1, Nos. 3, 8, 11, and 14 under the carbon steel-based connection for oil country tubular goods conditions were picked up, and salt water spraying was performed thereon.

As a material, a coupling sample was newly formed for this salt water spraying test.

The test was performed using a normal general mild steel thin steel sheet/cold rolled blunt sheet (SPCC) having a thickness of 0.8 mmt as Comparative Example (condition A).

In the connection for oil country tubular goods material, both ends of a coupling connection were made up and broken out once with a protector. Then, salt water was sprayed on samples which were left as they were (Nos. 3-2, 8-2, 11-2, and 14-2) and samples to which the protector was attached again and which were made up (corresponding to second make-up: Nos. 3-3, 8-3, 11-3, and 14-3). Thereafter, a corrosion test was performed under a condition in which the samples were observed side by side, that is, side by side in a state where the samples were not standing.

As the pin connection, a sample having only a thread was used, and the threaded side was made up and broken out once with a protector. An imide tape was attached to an outside where the protector was not attached again to prevent water from entering the pipe.

Detailed conditions are as follows.

Conditions of the solid lubricating coating films of Nos. 3-2 and 3-3, 8-2 and 8-3, 11-2 and 11-3, and 14-2 and 14-3 correspond to the conditions of Nos. 3, 8, 11, and 14 of Example 1, respectively.

<Salt Water Spraying Conditions>

Salt water spraying conditions are as follows.
Spraying conditions: JIS K 5600-7-1
Salt water concentration: 5±0.5 wt %
Temperature: 35° C.
Humidity: 98 to 99%
Spraying amount: 1-2 mL/hr/80 cm$^2$
pH: 6.5 to 7.2
Time: 24 hr The significance of this test method is as follows. A connection for oil country tubular goods is shipped after an end thereof is made up with a protector, and is often stored in a yard near a well as it is. Therefore, a state where salt water is sprayed on a connection is an environment close to actual use conditions. The condition that the protector is not attached means a more severe condition when the protector is removed. The case of the SPCC thin sheet is a case where make-up/break-out are not performed with a protector, in which the corrosion resistance of the film itself is observed by the form of a connection.

Results are presented in Table 5.

TABLE 5

| No. | Steel type | OD | WT | Screw type | Condition of solid lubricating coating film | Treatment before salt water spraying | Sample situation in salt water spraying | Corrosion result | Remarks |
|---|---|---|---|---|---|---|---|---|---|
| A | SPCC | 75 mm × 10.8 mm | 150 mm × | (Thin steel sheet) | Sold lubricating coating film on coupling screw film side of Example 1-No. 3 | None (Entire back surface: imide tape) (With imide tape at 10 mm from end surface on evaluation side) | Laid obliquely (Set in comb-shaped jig made of vinyl chloride) | Not corroded | Comparative Reference example |
| 3-2 | Q125 | 9⅝" | 53.5# | JFELION™ CPLG screw | Solid lubricating coating film on coupling screw film side of Example 1-No. 3 | Make/Break was performed with protector once | Protector was attached to sample again and sample was laid horizontally (which means that sample was no caused to stand) | Not corroded | Inventive example |
| 3-3 | Q125 | 9⅝" | 53.5# | JFELION™ CPLG screw | Solid lubricating coating film on coupling screw film side of Example 1-No. 3 | Make/Break was performed with protector once | Sample was laid horizontally in salt water spraying device (which means that sample was no caused to stand) | Not corroded | Inventive example |
| 8-2 | C110 | 9⅝" | 53.5# | JFELION™ CPLG screw | Solid lubricating coating film on coupling screw film side of Example 1-No. 8 | Make/Break was performed with protector once | Protector was attached to sample again and sample was laid horizontally (which means that sample was no caused to stand) | Not corroded | Inventive example |
| 8-3 | C110 | 9⅝" | 53.5# | JFELION™ CPLG screw | Solid lubricating coating film on coupling screw film side of Example 1-No. 8 | Make/Break was performed with protector once | Protector was attached to sample and sample was laid horizontally (which means that sample was no caused to stand) | Not corroded | Inventive example |
| 11-2 | C110 | 9⅝" | 53.5# | JFELION™ CPLG screw | Solid lubricating coating film on coupling screw film side of Example 1-No. 11 | Make/Break was performed with protector once | Protector was attached to sample again and sample was laid horizontally (which means that sample was no caused to stand) | Not corroded | Inventive example |
| 11-3 | C110 | 9⅝" | 53.5# | JFELION™ CPLG screw | Solid lubricating coating film on coupling screw film side of Example 1-No. 11 | Make/Break was performed with protector once | Protector was attached to sample and sample was laid horizontally (which means that sample was no caused to stand) | Not corroded | Inventive example |
| 14-2 | C110 | 7" | 29# | JFELION™ CPLG screw | Solid lubricating coating film on coupling screw film side of Example 1-No. 14 | Make/Break was performed with protector once | Protector was attached to sample and sample was laid horizontally (which means that sample was no caused to stand) | Not corroded | Inventive example |
| 14-3 | C110 | 7" | 29# | JFELION™ CPLG screw | Solid lubricating coating film on coupling screw film side of Example 1-No. 14 | Make/Break was performed with protector once | Protector was attached to sample and sample was laid horizontally (which means that sample was no caused to stand) | Not corroded | Inventive example |

As can be seen from Table 5, it has been found that none of Nos. 3-2, 3-3, 8-2, 8-3, 11-2, 11-3, 14-2, and 14-3 including No. A as Comparative Example is corroded by salt water spraying and has sufficient corrosion resistance.

It is estimated that this is because these samples have a hard film quality of 3H, these samples are not fatally damaged even when these samples are made up and broken out with a protector, and BN itself is water-repellent and does not draw water.

Here, the entire contents of Japanese Patent Application No. 2021-91463 (filed on May 31, 2021), the priority of which is claimed by the present application, are a part of the present disclosure by reference. Here, the description has been made with reference to a limited number of embodiments, but the scope of rights is not limited thereto, and modifications of each embodiment based on the above disclosure are obvious to those skilled in the art.

REFERENCE SIGNS LIST

1 Test pin
1a Male thread
1c Inner diameter surface
1d Through hole
2 Box (coupling)
2a Female thread
3 Heavy bob
4 Power tong
10A Solid lubricating coating film
10B Base layer
11 Hook fitting (Swivel type)
12 Penetrating rod
13 Insertion rod
20 Lifting device (crane;
21 Chain (Sling)

The invention claimed is:

1. An agent for forming a solid lubricating coating film on a thread portion of oil country tubular goods, wherein
a solid lubricant is dispersed in a binder resin,
the binder resin contains a prepolymer and a curing agent,
the prepolymer is formed of one or more epoxy resins, and 70 parts by weight or more of the prepolymer is contained with respect to 100 parts by weight of the binder resin,
the epoxy resin constituting the prepolymer has an epoxy equivalent of 100 or more and 500 or less,
the solid lubricant contains boron nitride (BN) in an amount of 80% by weight or more, and BN has an average particle size of 10 μm or less, and
a total weight of the solid lubricant is 0.1 times or more and two times or less a total weight of the binder resin.

2. The agent for forming a solid lubricating coating film according to claim 1, the agent comprising
a solvent component in an amount of 30 parts by weight or more and 80 parts by weight or less with respect to 100 parts by weight of a sum of a total weight of the solid lubricant and a total weight of the binder resin excluding the curing agent.

3. The agent for forming a solid lubricating coating film according to claim 1, the agent comprising
a curing accelerator in an amount of 0 parts by weight or more and 10 parts by weight or less with respect to 100 parts by weight of a total weight of the epoxy resin constituting the prepolymer.

4. The agent for forming a solid lubricating coating film according to claim 1, wherein
the epoxy resin constituting the prepolymer has more than two epoxy groups (polyfunctional epoxy resin).

5. The agent for forming a solid lubricating coating film according to claim 4, wherein
the epoxy resin constituting the prepolymer has six or less epoxy groups.

6. The agent for forming a solid lubricating coating film according to claim 4, wherein
the epoxy resin constituting the prepolymer has four or less epoxy groups.

7. The agent for forming a solid lubricating coating film according to claim 1, wherein
the curing agent is a curing agent to cure an epoxy resin, and is formed of an amine-based curing agent, an acid anhydride-based curing agent, a phenol-based curing agent, or a latent curing agent.

8. The agent for forming a solid lubricating coating film according to claim 7, wherein the epoxy resin constituting the prepolymer has a glass transition temperature Tg of 100° C. or higher.

9. The agent for forming a solid lubricating coating film according to claim 1, wherein the prepolymer has a viscosity of 20 mPa·sec or more and 2,000 mPa·sec or less.

10. An oil country tubular goods having a lubricating coating film including a solid lubricating coating film on a thread portion, wherein
the solid lubricating coating film is formed by dispersing a solid lubricant in a binder resin,
the binder resin contains an epoxy resin cured with a curing agent, and 70 parts by weight or more of the epoxy resin is contained with respect to 100 parts by weight of the binder resin,
the epoxy resin has an epoxy equivalent of 100 or more and 500 or less,
the solid lubricant contains boron nitride (BN) in an amount of 80% by weight or more, and BN has an average particle size of 10 μm or less,
a total weight of the solid lubricant is 0.1 times or more and two times or less a total weight of the binder resin, and
the solid lubricating coating film has a thickness of 10 μm or more and 150 μm or less.

11. The oil country tubular goods according to claim 10, wherein
the epoxy resin has more than two epoxy groups (polyfunctional epoxy resin).

12. The oil country tubular goods according to claim 11, wherein
the epoxy resin has six or less epoxy groups.

13. The oil country tubular goods according to claim 11, wherein
the epoxy resin has four or less epoxy groups.

14. The oil country tubular goods according to claim 10, wherein
the curing agent is a curing agent to cure an epoxy resin, and is formed of an amine-based curing agent, an acid anhydride-based curing agent, a phenol-based curing agent, or a latent curing agent.

15. The oil country tubular goods according to claim 14, wherein
the epoxy resin has a glass transition temperature Tg of 100° C. or higher.

16. The oil country tubular goods according to claim 10, wherein
   the solid lubricating coating film has a pencil hardness of 3H or more.

17. The oil country tubular goods according to claim 10, wherein
   the lubricating coating film has a base layer between a surface of the thread portion and the solid lubricating coating film, and
   the base layer is formed of a chemical conversion-treated layer or an electroplated layer.

18. A threaded joint for oil country tubular goods connecting a box having a female thread and a pin having a male thread, wherein
   oil country tubular goods of at least one of the box and the pin is constituted by the oil country tubular goods having the lubricating coating film according to claim 10.

19. The agent for forming a solid lubricating coating film according to claim 2, the agent comprising
   a curing accelerator in an amount of 0 parts by weight or more and 10 parts by weight or less with respect to 100 parts by weight of a total weight of the epoxy resin constituting the prepolymer.

20. The agent for forming a solid lubricating coating film according to claim 2, wherein
   the epoxy resin constituting the prepolymer has more than two epoxy groups (polyfunctional epoxy resin).

\* \* \* \* \*